(12) United States Patent
Ito

(10) Patent No.: US 12,545,753 B2
(45) Date of Patent: Feb. 10, 2026

(54) CURABLE COMPOSITION

(71) Applicant: DAICEL CORPORATION, Osaka (JP)

(72) Inventor: Daisuke Ito, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 766 days.

(21) Appl. No.: 17/786,692

(22) PCT Filed: Oct. 26, 2020

(86) PCT No.: PCT/JP2020/040077
§ 371 (c)(1),
(2) Date: Jun. 17, 2022

(87) PCT Pub. No.: WO2021/124681
PCT Pub. Date: Jun. 24, 2021

(65) Prior Publication Data
US 2023/0054785 A1    Feb. 23, 2023

(30) Foreign Application Priority Data

Dec. 19, 2019   (JP) .................. 2019-229221

(51) Int. Cl.
*C08F 22/40* (2006.01)
*C08K 5/14* (2006.01)
(Continued)

(52) U.S. Cl.
CPC ............... *C08F 22/40* (2013.01); *C08K 5/14* (2013.01); *C08L 35/00* (2013.01); *C09D 135/00* (2013.01); *C09J 135/00* (2013.01)

(58) Field of Classification Search
CPC . C08F 22/40; C08K 5/14; C08L 35/00; C09D 135/00; C09J 135/00
See application file for complete search history.

(56) References Cited

U.S. PATENT DOCUMENTS 4,320,224 A   3/1982  Rose et al.
4,851,494 A   7/1989  Eldin et al.
(Continued)

FOREIGN PATENT DOCUMENTS

JP   60-32642 B2   7/1985
JP   64-40525 A    2/1989
(Continued)

OTHER PUBLICATIONS

Hedrick (Year: 1992).*
(Continued)

*Primary Examiner* — John M Cooney
*Assistant Examiner* — Elizabeth Amato
(74) *Attorney, Agent, or Firm* — Birch, Stewart, Kolasch & Birch, LLP

(57) ABSTRACT

Provided is a curable composition having excellent workability and being capable of forming a cured product having super heat resistance by curing. The curable composition of the present disclosure includes a curable compound represented by Formula (1) below and a radical polymerization initiator. In the following formula, $R^1$ and $R^2$ each represent a curable functional group, and $D^1$ and $D^2$ each represent a single bond or a linking group. L represents a divalent group having a repeating unit containing a structure represented by Formula (I) below and a structure represented by Formula (II) below. $Ar^1$ to $Ar^3$ each represent an arylene group or a group in which two or more arylene groups are bonded via a single bond or a linking group. X represents —CO—, —S—, or —SO$_2$—, and Y represents —S—, —SO$_2$—, —O—, —CO—, —COO—, or —CONH—. n represents an integer of 0 or greater.

(Continued)

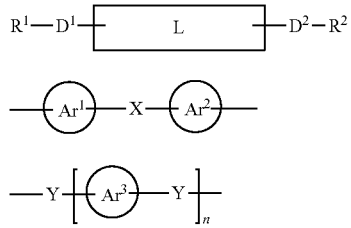

(I)

(II)

18 Claims, 4 Drawing Sheets

(51) Int. Cl.
*C08L 35/00* (2006.01)
*C09D 135/00* (2006.01)
*C09J 135/00* (2006.01)

(56) References Cited

U.S. PATENT DOCUMENTS

| | | | |
|---|---|---|---|
| RE34,085 E | 9/1992 | Rose et al. | |
| 6,281,323 B1 | 8/2001 | Yokota et al. | |
| 8,871,870 B2* | 10/2014 | He | C09D 147/00 525/232 |
| 11,021,438 B2 | 6/2021 | Yang et al. | |
| 12,037,319 B2* | 7/2024 | Ito | C09J 139/04 |
| 2009/0312519 A1 | 12/2009 | Uera et al. | |
| 2020/0079726 A1 | 3/2020 | Yang et al. | |

FOREIGN PATENT DOCUMENTS

| | | |
|---|---|---|
| JP | 3-88810 A | 4/1991 |
| JP | 4-261411 A | 9/1992 |
| JP | 2000-219741 A | 8/2000 |
| JP | 2010-18791 A | 1/2010 |
| JP | 2018-16679 A | 2/2018 |
| WO | WO 2018/107929 A1 | 6/2018 |

OTHER PUBLICATIONS

Extended European Search Report for corresponding European Application No. 20902801.8, dated Jan. 3, 2024.

Sundell et al., "Cross-Linking Disulfonated Poly(arylene ether sulfone) Telechelic Oligomers. 1. Synthesis, Characterization, and Membrane Preparation," Industrial & Engineering Chemistry Research, vol. 53, Jan. 31, 2014, pp. 2583-2593.

International Preliminary Report on Patentability and Written Opinion of the International Searching Authority (Forms PCT/IB/373 and PCT/ISA/237) for International Application No. PCT/JP2020/040077, dated May 17, 2022, with an English translation.

International Search Report (Form PCT/ISA/210) for International Application No. PCT/JP2020/040077, dated Dec. 28, 2020, with an English translation.

* cited by examiner

CURABLE COMPOSITION

TECHNICAL FIELD

The present disclosure relates to a curable composition and a structural body containing a cured product or a semi-cured product of the curable composition. The present disclosure claims priority to JP 2019-229221 filed in Japan on Dec. 19, 2019, the contents of which are incorporated herein.

BACKGROUND ART

Engineering plastics are plastics having enhanced heat resistance and mechanical properties and are very useful as materials essential for miniaturization, weight reduction, performance enhancement, and reliability enhancement of various types of parts. However, an engineering plastic has a high melting temperature and a low solvent solubility, leading to a problem of poor workability.

For example, polyimides described in Patent Document 1 and the like have excellent heat resistance and strength characteristics but are poorly soluble and meltable, which makes it difficult to perform melt-molding for such polyimides or to use such polyimides as matrix resins for composite materials.

Polyether ether ketone (PEEK), which is also called a "super engineering plastic", is a thermoplastic resin having excellent performances for heat resistance, flame retardance, and electrical characteristics at a continuous use temperature of 260° C.; however, because the melting point thereof is 343° C., it is especially difficult to melt the plastic as well as difficult to dissolve the plastic in a solvent, and thus poor workability has been problematic (e.g., Patent Document 2).

Therefore, a curable compound having excellent workability and being capable of forming a cured product having super heat resistance has been demanded.

CITATION LIST

Patent Document

Patent Document 1: JP 2000-219741 A
Patent Document 2: JP 60-032642 B

SUMMARY OF INVENTION

Technical Problem

An object of the present disclosure is to provide a curable composition having excellent workability and being capable of forming a cured product having super heat resistance and flexibility by curing.

Another object of the present disclosure is to provide a curable composition having excellent workability and being capable of forming a cured product having super heat resistance and flexibility even by heat-curing at a low temperature.

Another object of the present disclosure is to provide a curable composition having excellent workability and storage stability and being capable of forming a cured product having super heat resistance and flexibility even by heat-curing at a low temperature.

Another object of the present disclosure is to provide a cured product or a semi-cured product having super heat resistance and flexibility.

Another object of the present disclosure is to provide a structural body containing a cured product or a semi-cured product having super heat resistance and flexibility.

Another object of the present disclosure is to provide a laminate having a configuration in which a cured product or a semi-cured product having super heat resistance and flexibility and a substrate are laminated.

Another object of the present disclosure is to provide a method for producing a laminate having a configuration in which a cured product or a semi-cured product having super heat resistance and flexibility and a substrate are laminated.

Another object of the present disclosure is to provide a composite material containing a cured product or a semi-cured product having super heat resistance and flexibility and a fiber.

Another object of the present disclosure is to provide an adhesive agent, a sealing agent, or a paint that has excellent workability and can be used in an environment requiring super heat resistance and flexibility.

Solution to Problem

As a result of diligent research to solve the problems described above, the present inventors have found that the problems described above can be solved by a curable composition obtained by blending a radical polymerization initiator in a curable compound represented by Formula (1) below. The present disclosure has been completed based on these findings.

Specifically, the present disclosure provides a curable composition containing a curable compound represented by Formula (1) below and a radical polymerization initiator.

[Chem. 1]

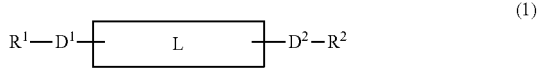

(1)

In the formula, $R^1$ and $R^2$ are identical or different, and each represent a curable functional group, and $D^1$ and $D^2$ are identical or different, and each represent a single bond or a linking group. L represents a divalent group having a repeating unit containing a structure represented by Formula (I) below and a structure represented by formula (II) below.

[Chem. 2]

(I)

(II)

In the formula, $Ar^1$ to $Ar^3$ are identical or different, and each represent an arylene group or a group in which two or more arylene groups are bonded via a single bond or a linking group. X represents —CO—, —S—, or —SO$_2$—, and Y is identical or different and each represents —S—, —SO$_2$—, —O—, —CO—, —COO—, or —CONH—. n represents an integer of 0 or greater.

An embodiment of the present disclosure also provides the curable composition, in which the radical polymerization initiator is a peroxide or an peracid ester.

An embodiment of the present disclosure also provides the curable composition, in which $R^1$ and $R^2$ in Formula (1) are identical or different, and each are a curable functional group having a cyclic imide structure.

An embodiment of the present disclosure also provides the curable composition, in which $R^1$ and $R^2$ in Formula (1) are identical or different, and each are a group selected from groups represented by Formulas (r-1) to (r-6) below.

[Chem. 3]

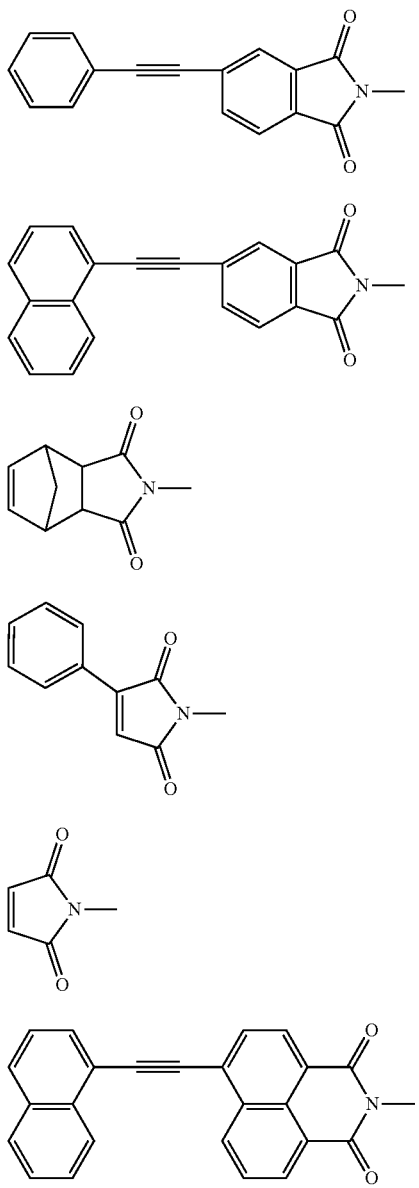

A bond from a nitrogen atom in each of the formulas bonds to $D^1$ or $D^2$.

An embodiment of the present disclosure also provides the curable composition, in which $D^1$ and $D^2$ in Formula (1) are identical or different, and each are a group selected from groups including structures represented by Formulas (d-1) to (d-4) below.

[Chem. 4]

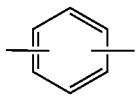 (d-1)

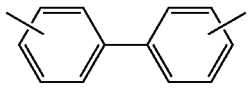 (d-2)

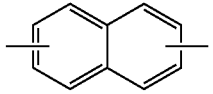 (d-3)

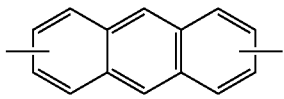 (d-4)

An embodiment of the present disclosure also provides the curable composition, in which $Ar^1$ to $Ar^3$ in Formula (I) and Formula (II) are identical or different, and each are an arylene group having from 6 to 14 carbons or a group in which two or more arylene groups each having from 6 to 14 carbons are bonded via a single bond, a linear or branched alkylene group having from 1 to 5 carbons, or a group in which one or more hydrogen atoms of a linear or branched alkylene group having from 1 to 5 carbons are substituted by halogen atom(s).

An embodiment of the present disclosure also provides the curable composition, in which the structure represented by Formula (I) is a structure derived from benzophenone.

An embodiment of the present disclosure also provides the curable composition, in which a proportion of a structural unit derived from benzophenone in a total amount of the compound represented by Formula (1) is 5 wt. % or greater.

An embodiment of the present disclosure also provides the curable composition, in which the structure represented by Formula (II) is a structure derived from at least one compound selected from the group consisting of hydroquinone, resorcinol, 2,6-naphthalenediol, 2,7-naphthalenediol, 4,4'-dihydroxybiphenyl, 4,4'-dihydroxydiphenyl ether, 4,4'-dihydroxybenzophenone, 4,4'-dihydroxydiphenyl sulfide, 4,4'-dihydroxydiphenyl sulfone, and bisphenol A.

An embodiment of the present disclosure also provides the curable composition, in which a proportion of a structural unit derived from hydroquinone, resorcinol, 2,6-naphthalenediol, 2,7-naphthalenediol, 4,4'-dihydroxybiphenyl, 4,4'-dihydroxydiphenyl ether, 4,4'-dihydroxybenzophenone, 4,4'-dihydroxydiphenyl sulfide, 4,4'-dihydroxydiphenyl sulfone, and bisphenol A in a total amount of the compound represented by Formula (1) is 5 wt. % or greater.

An embodiment of the present disclosure also provides a cured product of the curable composition.

An embodiment of the present disclosure also provides a semi-cured product of the curable composition.

An embodiment of the present disclosure also provides a structural body including a cured product or a semi-cured product of the curable composition.

An embodiment of the present disclosure also provides a laminate having a configuration in which a cured product or a semi-cured product of the curable composition and a substrate are laminated.

An embodiment of the present disclosure also provides a method for producing a laminate, including placing the curable composition on a substrate and performing heat treatment to obtain a laminate having a configuration in which a cured product or a semi-cured product of the curable composition and the substrate are laminated.

An embodiment of the present disclosure also provides the method for producing a laminate, in which the method includes applying a molten product of the curable composition on a support made of plastic, solidifying the applied molten product to form a thin film containing the curable compound, peeling the formed thin film from the support, laminating the formed thin film on a substrate, and performing heat treatment.

An embodiment of the present disclosure also provides a composite material including a cured product or a semi-cured product of the curable composition and a fiber.

An embodiment of the present disclosure also provides an adhesive agent containing the curable composition.

An embodiment of the present disclosure also provides a paint containing the curable composition.

An embodiment of the present disclosure also provides a sealing agent containing the curable composition.

Advantageous Effects of Invention

The curable composition of the present disclosure contains a curable compound having good solvent solubility and a low melting temperature. Thus, the curable composition has excellent workability. Or, the curable composition has easy moldability. Further, the curable composition contains a radical polymerization initiator together with the curable compound. Thus, as compared with a case where the radical polymerization initiator is not contained, an effect of lowering a curing start temperature while maintaining storage stability can be achieved.

The curing reaction of the curable composition can proceed and be completed even at a low temperature, and accordingly, the curable composition is capable of forming a cured product having excellent flexibility and cracking resistance. Furthermore, the obtained cured product has super heat resistance, flame retardance, and good dielectric properties (low relative permittivity and dielectric loss tangent).

The curable composition has the properties described above and thus can be suitably used as, for example, an adhesive agent, a sealing agent, a paint, or a sizing agent.

Furthermore, the cured product or cured product of the curable composition can be suitably used in the fields requiring super heat resistance and good dielectric properties (e.g., electronic information devices, household appliances, automobiles, precision machines, aircraft, devices for aerospace industry, etc.).

DESCRIPTION OF EMBODIMENTS

Curable Composition

Figure 1:
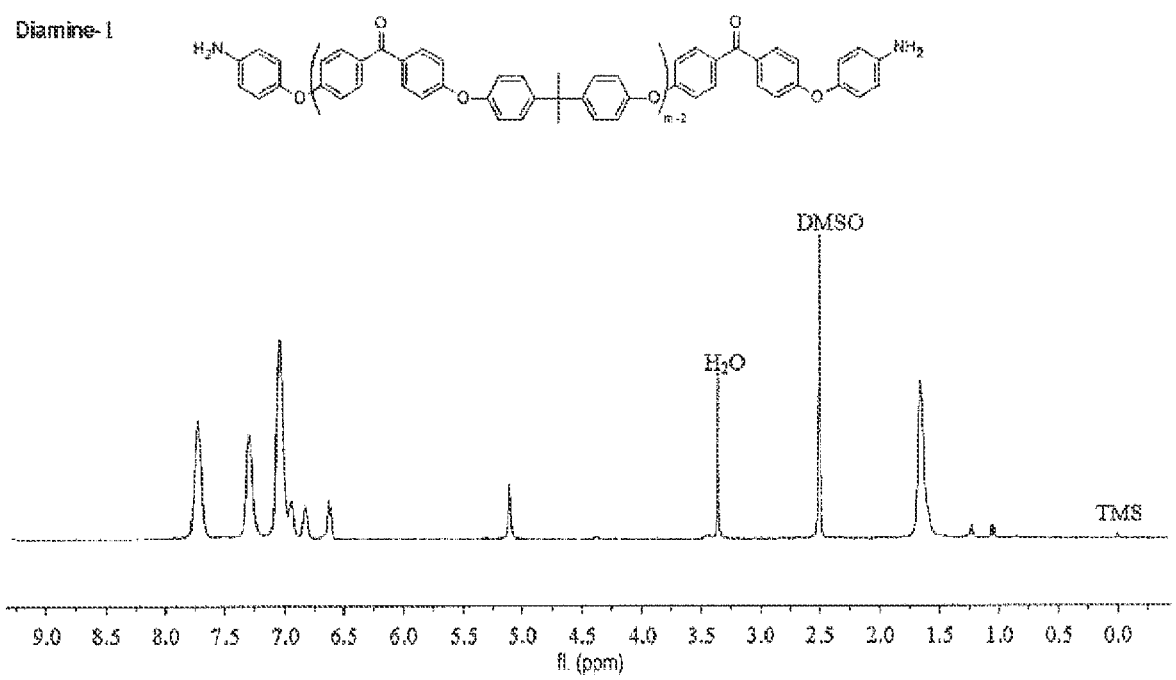
FIG. 1 is a diagram showing a $^1$H-NMR spectrum (DMSO-$d_6$) of diamine (1) prepared in Preparation Example.

The curable composition contains at least a curable compound and a radical polymerization initiator.

Curable Compound

The curable compound is represented by Formula (1) below:

[Chem. 5]

(1)

In Formula (1), $R^1$ and $R^2$ are identical or different and each represent a curable functional group, and $D^1$ and $D^2$ are identical or different and each represent a single bond or a linking group. L represents a divalent group having a repeating unit containing a structure represented by Formula (I) below and a structure represented by Formula (II) below.

[Chem. 6]

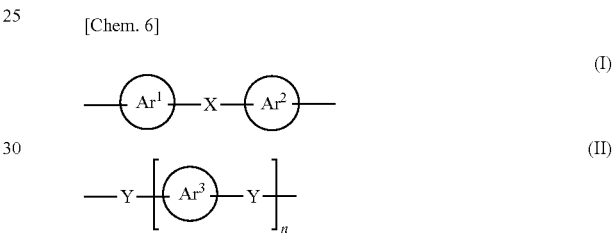

(I)

(II)

In the formula, $Ar^1$ to $Ar^3$ are identical or different, and each represent an arylene group or a group in which two or more arylene groups are bonded via a single bond or a linking group. X represents —CO—, —S—, or —SO$_2$—, and Y is identical or different and each represents —S—, —SO$_2$—, —O—, —CO—, —COO—, or —CONH—. n represents an integer of 0 or greater.

In the formula, $R^1$ and $R^2$ each represent a curable functional group. $R^1$ and $R^2$ may be identical or different. As the curable functional group of $R^1$ and $R^2$, for example, a curable functional group having a cyclic imide structure, such as a group represented by Formula (r) below, is preferred.

[Chem. 7]

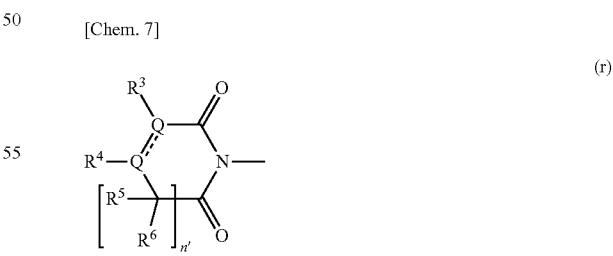

(r)

A bond from a nitrogen atom in the formula bonds to $D^1$ or $D^2$.

In Formula (r) above, Q represents C or CH. Two Q's in the formula bond to each other via a single bond or a double bond. n' is an integer of 0 or greater (e.g., an integer from 0 to 3, and preferably 0 or 1). $R^3$ to $R^6$ are identical or different, and each represent a hydrogen atom, a saturated or unsaturated aliphatic hydrocarbon group (preferably an alkyl group having from 1 to 10 carbons, an alkenyl group having from 2 to 10 carbons, or an alkynyl group having from 2 to 10 carbons), an aromatic hydrocarbon group (preferably an aryl group having from 6 to 10 carbons, such as a phenyl group or a naphthyl group), or a group in which two or more groups selected from the saturated or unsaturated aliphatic hydrocarbon groups and aromatic hydrocarbon groups described above are bonded. Two groups selected from $R^3$ to $R^6$ may be bonded to each other to form a ring together with adjacent carbon atoms.

Examples of the ring that may be formed by allowing two groups selected from $R^3$ to $R^6$ to be bonded to each other together with adjacent carbon atoms include alicyclic rings having from 3 to 20 carbons and aromatic rings having from 6 to 14 carbons. Examples of the alicyclic rings having from 3 to 20 carbons include approximately 3 to 20-membered (preferably 3 to 15-membered, particularly preferably 5 to 8-membered) cycloalkane rings, such as a cyclopropane ring, a cyclobutane ring, a cyclopentane ring, and a cyclohexane ring; approximately 3 to 20-membered (preferably 3 to 15-membered, particularly preferably 5 to 8-membered) cycloalkene rings, such as a cyclopentene ring and a cyclohexene ring; and crosslinked cyclic hydrocarbon groups, such as a perhydronaphthalene ring, a norbornane ring, a norbornene ring, an adamantane ring, a tricyclo[5.2.1.0$^{2,6}$] decane ring, and a tetracyclo[4.4.0.1$^{2,5}$.1$^{7,10}$]dodecane ring. The aromatic rings having from 6 to 14 carbons include a benzene ring and a naphthalene ring.

The curable functional group having a cyclic imide structure is, in particular, preferably a curable functional group having an unsaturated cyclic imide structure or a curable functional group having a cyclic imide structure having an arylethynyl group, and particularly preferably a group selected from the groups represented by Formulas (r-1) to (r-6) below, and especially preferably a group represented by Formula (r-1) or (r-5) below.

[Chem. 8]

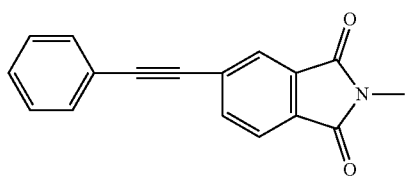
(r-1)

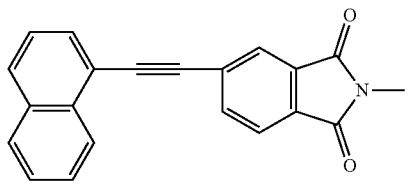
(r-2)

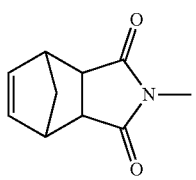
(r-3)

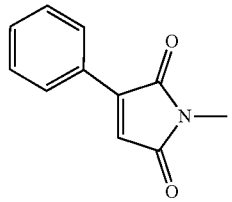
(r-4)

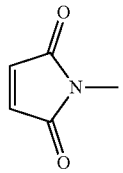
(r-5)

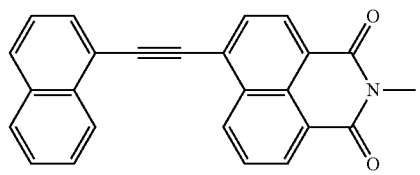
(r-6)

A bond from a nitrogen atom in each of the formulas bonds to $D^1$ or $D^2$ in Formula (1).

One or two or more substituents may be bonded to each of the groups represented by Formulas (r-1) to (r-6) above. Examples of the substituent include alkyl groups having from 1 to 6 carbons, alkoxy groups having from 1 to 6 carbons, and halogen atoms.

Examples of the alkyl group having from 1 to 6 carbons include linear or branched alkyl groups, such as a methyl group, an ethyl group, a propyl group, an isopropyl group, a butyl group, an isobutyl group, an s-butyl group, a t-butyl group, a pentyl group, and a hexyl group.

Examples of the alkoxy group having from 1 to 6 carbons include linear or branched alkoxy groups, such as a methoxy group, an ethoxy group, a butoxy group, and a t-butyloxy group.

In Formula (1), $D^1$ and $D^2$ are identical or different, and each represent a single bond or a linking group. Examples of the linking group include divalent hydrocarbon groups, divalent heterocyclic groups, a carbonyl group, an ether bond, an ester bond, a carbonate bond, an amido bond, an imido bond, and groups made by linking a plurality of these.

The divalent hydrocarbon group includes a divalent aliphatic hydrocarbon group, a divalent alicyclic hydrocarbon group, and a divalent aromatic hydrocarbon group.

Examples of the divalent aliphatic hydrocarbon group include linear or branched alkylene groups having from 1 to 18 carbons and linear or branched alkenylene groups having from 2 to 18 carbons. Examples of the linear or branched alkylene group having from 1 to 18 carbons include a methylene group, a methyl methylene group, a dimethyl methylene group, an ethylene group, a propylene group, and a trimethylene group. Examples of the linear or branched alkenylene group having from 2 to 18 carbons include a vinylene group, a 1-methylvinylene group, a propenylene group, a 1-butenylene group, and a 2-butenylene group.

The divalent alicyclic hydrocarbon group include divalent alicyclic hydrocarbon groups having from 3 to 18 carbons, and examples thereof include cycloalkylene groups (including cycloalkylidene groups), such as a 1,2-cyclopentylene group, a 1,3-cyclopentylene group, a cyclopentylidene group, a 1,2-cyclohexylene group, a 1,3-cyclohexylene group, a 1,4-cyclohexylene group, and a cyclohexylidene group.

Examples of the divalent aromatic hydrocarbon group include arylene groups having from 6 to 14 carbons, and examples thereof include a 1,4-phenylene group, a 1,3-phenylene group, a 4,4'-biphenylene group, a 3,3'-biphenylene group, a 2,6-naphthalenediyl group, a 2,7-naphthalenediyl group, a 1,8-naphthalenediyl group, and an anthracenediyl group.

Heterocycles constituting the divalent heterocyclic groups include aromatic heterocycles and nonaromatic heterocycles. Examples of such a heterocycle include 3 to 10-membered rings (preferably 4 to 6-membered rings) having carbon atoms and at least one heteroatom (e.g., oxygen atom, sulfur atom, or nitrogen atom) as atoms constituting the ring, and condensed rings thereof. Specific examples thereof include heterocycles containing an oxygen atom as a hetero atom (e.g., 3-membered rings, such as an oxirane ring; 4-membered rings, such as an oxetane ring; 5-membered rings, such as a furan ring, a tetrahydrofuran ring, an oxazole ring, an isoxazole ring, and a γ-butyrolactone ring; 6-membered rings, such as a 4-oxo-4H-pyran ring, a tetrahydropyran ring, and a morpholine ring; condensed rings, such as a benzofuran ring, an isobenzofuran ring, a 4-oxo-4H-chromene ring, a chroman ring, and an isochroman ring; crosslinked rings, such as a 3-oxatricyclo [4.3.1.1$^{4,8}$]undecan-2-one ring and a 3-oxatricyclo [4.2.1.0$^{4,8}$]nonan-2-one ring), heterocycles containing a sulfur atom as a hetero atom (e.g., 5-membered rings, such as a thiophene ring, a thiazole ring, an isothiazole ring, and a thiadiazole ring; and 6-membered rings, such as a 4-oxo-4H-thiopyran ring; condensed rings, such as a benzothiophene ring), and heterocycles containing a nitrogen atom as a hetero atom (e.g., 5-membered rings, such as a pyrrole ring, a pyrrolidine ring, a pyrazole ring, an imidazole ring, and a triazole ring; 6-membered rings, such as an isocyanuric ring, a pyridine ring, a pyridazine ring, a pyrimidine ring, a pyrazine ring, a piperidine ring, and a piperazine ring; condensed rings, such as an indole ring, an indoline ring, a quinoline ring, an acridine ring, a naphthyridine ring, a quinazoline ring, and a purine ring). The divalent heterocyclic group is a group obtained by removing two hydrogen atoms from the heterocycle structure described above.

$D^1$ and $D^2$ described above preferably include a divalent aromatic hydrocarbon group, in particular, from the perspective of being able to obtain a cured product having outstanding heat resistance. The divalent aromatic hydrocarbon group is preferably a divalent aromatic hydrocarbon group having from 6 to 14 carbons, more preferably a group selected from the groups represented by Formulas (d-1) to (d-4) below, and especially preferably a group represented by Formula (d-1) below (1,2-phenylene group, 1,3-phenylene group, or 1,4-phenylene group).

[Chem. 9]

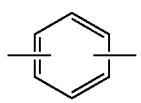
(d-1)

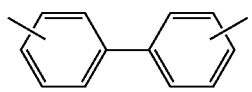
(d-2)

-continued

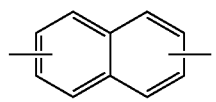
(d-3)

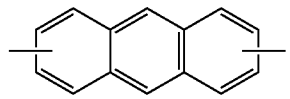
(d-4)

Furthermore, $D^1$ and $D^2$ described above is preferably a group in which, together with the divalent aromatic hydrocarbon group, at least one group selected from the group consisting of a carbonyl group, an ether bond, an ester bond, a carbonate bond, an amido bond, and an imido bond is linked, and especially preferably a group in which an ether bond is linked to the divalent aromatic hydrocarbon group described above.

Thus, the $R^1$-$D^1$-moiety and the $R^2$-$D^2$-moiety in Formula (1) are identical or different, and are each preferably a group containing a group represented by Formula (rd-1) or (rd-2) below, and particularly preferably a group represented by Formula (rd-1-1) or (rd-2-1) below.

[Chem. 10]

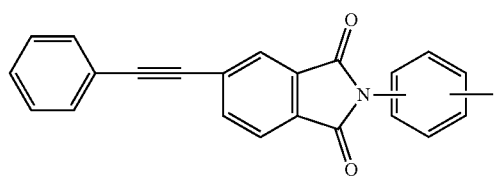
(rd-1)

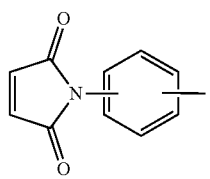
(rd-2)

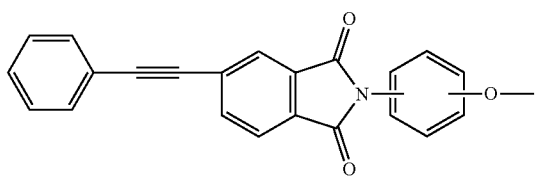
(rd-1-1)

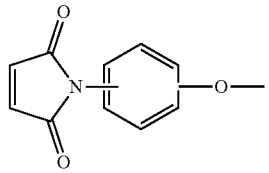
(rd-2-1)

A bond from a phenylene group or an oxygen atom in the formulas bonds to L in Formula (1).

L in Formula (1) represents a divalent group having a repeating unit containing a structure represented by Formula (I) above and a structure represented by Formula (II) above. $Ar^1$ to $Ar^3$ in Formula (I) and Formula (II) are identical or different, and each represent an arylene group or a group in which two or more arylene groups are bonded via a single bond or a linking group. X represents —CO—, —S—, or —SO$_2$—, and Y is identical or different, and each represents —S—, —SO$_2$—, —O—, —CO—, —COO—, or —CONH—. n represents an integer of 0 or greater and is, for example, an integer from 0 to 5, preferably an integer from 1 to 5, and particularly preferably an integer from 1 to 3.

The arylene group is a group in which two hydrogen atoms have been removed from a structural formula of an aromatic ring (=aromatic hydrocarbon ring). Examples of the aromatic ring include aromatic rings having from 6 to 14 carbons, such as benzene, naphthalene, anthracene, and phenanthrene. The aromatic ring is, in particular, preferably an aromatic ring having from 6 to 10 carbons such as benzene or naphthalene, and the arylene group is preferably an arylene group having from 6 to 10 carbons, among others.

Examples of the linking group include divalent hydrocarbon groups having from 1 to 5 carbons and groups in which one or more hydrogen atoms of a divalent hydrocarbon group having from 1 to 5 carbons is substituted by halogen atom(s).

Examples of the divalent hydrocarbon groups having from 1 to 5 carbons include linear or branched alkylene groups having from 1 to 5 carbons, such as a methylene group, a methylmethylene group, a dimethylmethylene group, a dimethylene group, and a trimethylene group; linear or branched alkenylene groups having from 2 to 5 carbons, such as a vinylene group, 1-methylvinylene group, and a propenylene group; and linear or branched alkynylene groups having from 2 to 5 carbons, such as an ethynylene group, a propynylene group, and 1-methylpropynylene group. Among these, a linear or branched alkylene group having from 1 to 5 carbons is preferred, and a branched alkylene group having from 1 to 5 carbons is particularly preferred.

Thus, Ar$^1$ to Ar$^3$ described above are identical or different, and are each preferably an arylene group having from 6 to 14 carbons or a group in which two or more arylene groups having from 6 to 14 carbons are bonded via a single bond, a linear or branched alkylene group having from 1 to 5 carbons, or a group in which one or more hydrogen atoms of a linear or branched alkylene group having from 1 to 5 carbons are substituted by halogen atom(s), and are each particularly preferably an arylene group having from 6 to 14 carbons or a group in which two or more arylene groups having from 6 to 14 carbons are bonded via a single bond, a branched alkylene group having from 1 to 5 carbons, or a group in which one or more hydrogen atoms of a branched alkylene group having from 1 to 5 carbons are substituted by halogen atom(s).

Ar$^1$ to Ar$^3$ described above are identical or different and, among others, are each preferably a group selected from the groups represented by Formulas (a-1) to (a-5) below. Note that, in the following formulas, positions of bonding are not particularly limited.

[Chem. 11]

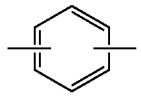
(a-1)

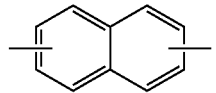
(a-2)

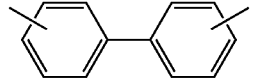
(a-3)

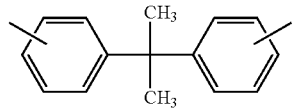
(a-4)

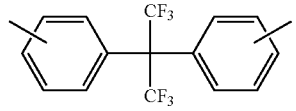
(a-5)

Ar$^1$ and Ar$^2$ in Formula (I) are, in particular, each preferably an arylene group having from 6 to 14 carbons, and particularly preferably a group represented by Formula (a-1) or (a-2) above. Furthermore, in particular, X in Formula (I) is preferably —CO— or —SO$_2$—. The structure represented by Formula (I) especially preferably contains a structure derived from benzophenone.

The proportion of the structure derived from an aromatic ring in the total amount of the compound represented by Formula (1) is 50 wt. % or greater, for example, preferably 60 wt. % or greater, and particularly preferably 65 wt. % or greater. Note that the upper limit of the proportion of the structure derived from an aromatic ring is, for example, 90 wt. %, and preferably 80 wt. %.

The proportion of the structural unit derived from benzophenone in the total amount of the compound represented by Formula (1) is, for example, 5 wt. % or greater, preferably from 10 to 62 wt. %, and particularly preferably from 15 to 60 wt. %.

Ar$^3$ in Formula (II) is, in particular, preferably a group selected from the groups represented by Formulas (a-1), (a-4), and (a-5) above. Furthermore, in particular, Y is preferably —S—, —O—, or —SO$_2$—. The structure represented by Formula (II) preferably includes a structure derived from at least one compound selected from the group consisting of hydroquinone, resorcinol, 2,6-naphthalenediol, 2,7-naphthalenediol, 4,4'-dihydroxybiphenyl, 4,4'-dihydroxydiphenyl ether, 4,4'-dihydroxybenzophenone, 4,4'-dihydroxydiphenyl sulfide, 4,4'-dihydroxydiphenyl sulfone, and bisphenol A, and particularly preferably includes a structure derived from at least one compound selected from the group consisting of hydroquinone, resorcinol, and bisphenol A.

The proportion of a structural unit derived from hydroquinone, resorcinol, 2,6-naphthalenediol, 2,7-naphthalenediol, 4,4'-dihydroxybiphenyl, 4,4'-dihydroxydiphenyl ether, 4,4'-dihydroxybenzophenone, 4,4'-dihydroxydiphenyl sulfide, 4,4'-dihydroxydiphenyl sulfone, and bisphenol A in the total amount of the compound represented by Formula (1) is, for example, 5 wt. % or greater, preferably from 10 to 55 wt. %, and particularly preferably from 15 to 53 wt. %.

Furthermore, the proportion of the structural unit derived from hydroquinone, resorcinol, and bisphenol A in the total amount of the compound represented by Formula (1) is, for example, 5 wt. % or greater, preferably from 10 to 55 wt. %, and particularly preferably from 15 to 53 wt. %.

L in Formula (1) is, in particular, preferably a divalent group represented by Formula (L-1) below from the perspective of being able to obtain a cured product having outstanding heat resistance.

[Chem. 12]

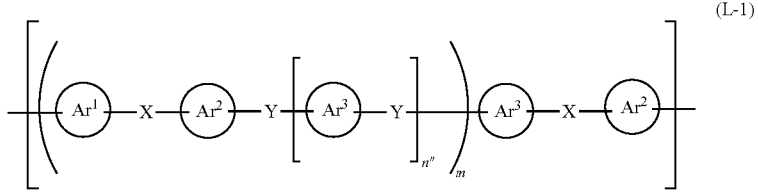

(L-1)

In Formula (L-1) above, m is a number of repeating unit shown in round brackets included in the molecular chain (=divalent group represented by Formula (L-1) above), that is, the average degree of polymerization, and is, for example, from 2 to 50, preferably from 3 to 40, more preferably from 4 to 30, particularly preferably from 5 to 20, and most preferably from 5 to 10. In the case where m is less than 2, strength and heat resistance of the resulting cured product tend to be insufficient. On the other hand, in the case where m is greater than 50, the melting temperature tends to be high. In addition, the solvent solubility tends to decrease. Note that the value of m can be determined by GPC measurement or spectrum analysis of NMR. Furthermore, n" in Formula (L-1) above represents an integer of 0 or greater, and $Ar^1$ to $Ar^3$, X, and Y are the same as those described above. Note that a plurality of $Ar^1$ moieties in Formula (L-1) above represent identical groups. The same applies for $Ar^2$ and $Ar^3$.

L in Formula (1) is especially preferably a divalent group represented by Formula (L-1-1) or (L-1-2) below.

Furthermore, a compound represented by Formula (1), in which L in Formula (1) is a divalent group represented by Formula (L-1-1) or (L-1-2) above and m1 and m2 in the formula are each from 5 to 10, melts at 300° C. or lower (approximately 250° C.), thus can be melt-molded at a lower temperature than that for PEEK or the like, and achieves outstanding workability.

Meanwhile, when the average degree of polymerization of the molecular chain is less than the range described above, the resulting cured product tends to be brittle and mechanical characteristics tends to decrease. Furthermore, when the average degree of polymerization of the molecular chain is greater than the range described above, workability tends to decrease due to, for example, decrease of solubility in a solvent and increase of melt viscosity.

The number average molecular weight (Mn) of the compound represented by Formula (1) is, for example, from 1000 to 15000, preferably from 1000 to 14000, particularly preferably from 1100 to 12000, and most preferably from 1200 to 10000. Therefore, while a high solubility in solvents, low melt viscosity, and easy processing are achieved, the resulting cured product (or molded body after curing) exhibits high toughness. A number average molecular weight less than the range described above tends to reduce

[Chem. 13]

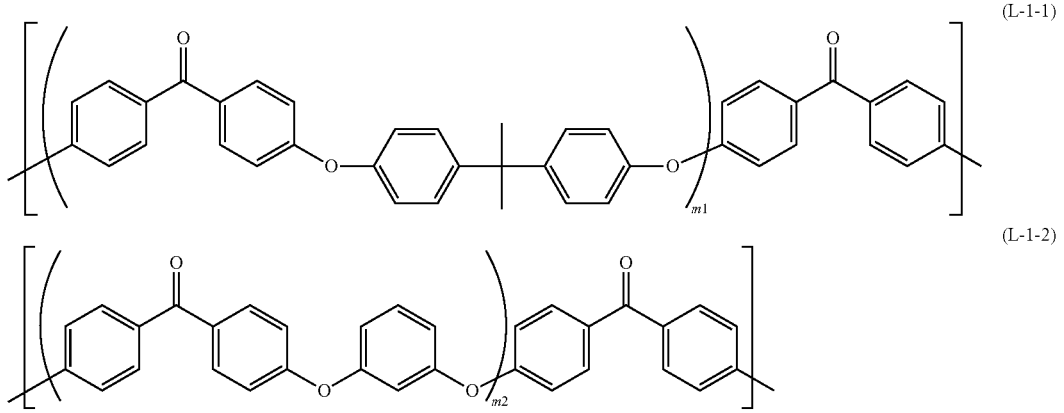

(L-1-1)

(L-1-2)

In the formula above, m1 and m2 each are a number of repeating unit shown in round brackets included in the molecular chain (=divalent group represented by Formula (L-1-1) or (L-1-2) above), that is, the average degree of polymerization, and each are, for example, from 2 to 50, preferably from 3 to 40, more preferably from 4 to 30, particularly preferably from 5 to 20, and most preferably from 5 to 10. Note that the values of m1 and m2 can be determined by GPC measurement or spectrum analysis of NMR.

toughness of the resulting cured product. On the other hand, a number average molecular weight greater than the range described above tends to reduce solvent solubility or increase melt viscosity excessively, thereby impairing workability. Note that Mn is determined by gel permeation chromatography (GPC) measurement (solvent: chloroform; calibrated with polystyrene standard).

The compound represented by Formula (1) has good solvent solubility. Examples of the solvent include ketones, such as acetone, methyl ethyl ketone, methyl isobutyl ketone, and cyclohexanone; amides, such as formamide, acetamide, N-methyl-2-pyrrolidone (NMP), N,N-dimethylformamide, and dimethylacetamide; halogenated hydrocarbons, such as methylene chloride, chloroform, 1,2-dichloroethane, chlorobenzene, bromobenzene, dichlorobenzene, benzotrifluoride, and hexafluoro-2-propanol; sulfoxides, such as dimethylsulfoxide (DMSO), diethyl sulfoxide, and benzyl phenyl sulfoxide; ethers, such as diethyl ether, diisopropyl ether, dibutyl ether, tetrahydrofuran (THF), dioxane, 1,2-dimethoxyethane, and cyclopentyl methyl ether; esters, such as ethyl acetate; nitriles, such as acetonitrile and benzonitrile; aromatic hydrocarbons, such as benzene, toluene, and xylene; liquid mixtures of two or more types of these. The compound exhibits excellent solubility in, in particular, at least one solvent selected from the group consisting of ethers, ketones, amides, halogenated hydrocarbons, and sulfoxides (among others, at least one solvent selected from the group consisting of ethers, amides, halogenated hydrocarbons, and sulfoxides).

The solubility of the compound represented by Formula (1) in a solvent is 1 g or greater, preferably 5 g or greater, and particularly preferably 10 g or greater, per 100 g of the solvent at 25° C.

The glass transition temperature (Tg) of the compound represented by Formula (1) is, for example, 280° C. or lower, preferably from 80 to 280° C., more preferably from 80 to 250° C., and particularly preferably from 100 to 200° C. The compound represented by Formula (1) has a low melting temperature, and thus the curable composition including the compound represented by Formula (1) has excellent workability. When Tg of the compound represented by Formula (1) is above the range described above, heating at a high temperature is required when melting, and the workability of the curable composition tends to decrease. Note that Tg can be measured by a DSC method.

The exothermic peak temperature of the compound represented by Formula (1) depends on the type of the curable functional group but is, for example, from 170 to 450° C., preferably from 200 to 430° C., and particularly preferably from 220 to 420° C. For example, in the case of the compound represented by Formula (1) in which $R^1$ and $R^2$ are each a group represented by Formula (r-5) above, the exothermic peak temperature is approximately 250° C. Note that the exothermic peak temperature is determined by DSC measurement.

The compound represented by Formula (1) can be heat-treated (heating temperature is, for example, 250° C. to 350° C.) to form a cured product.

The curable composition may contain one type of a compound represented by Formula (1) alone, or a combination of two or more types thereof. The content of the compound represented by Formula (1) (in a case where two or more types are contained, the total amount thereof) in the total amount of the curable composition (or the total amount of non-volatile contents of the curable composition) is, for example, 30 wt. % or greater, preferably 50 wt. % or greater, particularly preferably 70 wt. % or greater, and most preferably 90 wt. % or greater.

Method for Producing Compound Represented by Formula (1)

The compound represented by Formula (1) above can be produced by using, for example, a synthesis method described in Polymer p. 978 (1989). One example of the method for producing the compound represented by Formula (1) above is described below; however, the present disclosure is not limited to the compound produced by this production method.

The compound represented by Formula (1a) below can be produced by, for example, steps [1] to [3] below. In the formula below, $Ar^1$ to $Ar^3$, X, Y, n, $R^3$ to $R^6$, Q, and n' are identical to those described above. D represents a linking group, and Z represents a halogen atom. m is the average degree of polymerization of the repeating unit and is, for example, from 3 to 50, preferably from 4 to 30, and particularly preferably from 5 to 20. Among the compounds represented by Formula (1) above, compounds besides the compound represented by Formula (1a) below can be produced in accordance with the following method.

Step [1]: A compound represented by Formula (2) below and a compound represented by Formula (3) below as reaction base substances are reacted in the presence of a base, and thus a compound represented by Formula (4) below is obtained.

Step [2]: An aminoalcohol (a compound represented by Formula (5) below) is reacted with the compound represented by Formula (4) below, and thus a diamine represented by Formula (6) below is obtained.

Step [3]: A cyclic acid anhydride (a compound represented by Formula (7) below) is reacted with the diamine represented by Formula (6) below, and thus a compound represented by Formula (1a) below is obtained.

[Chem. 14]

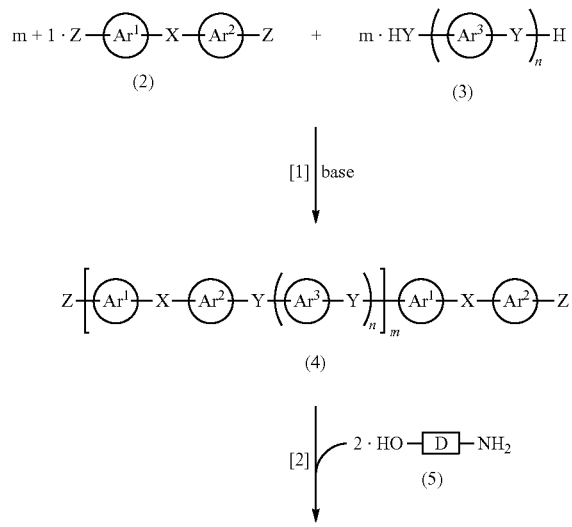

-continued

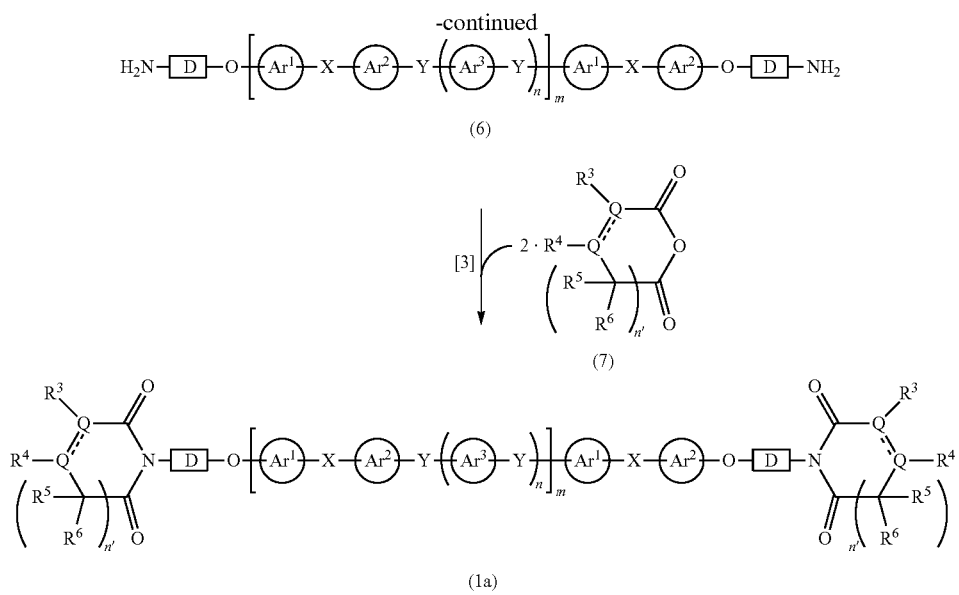

Step [1]

Examples of the compound represented by Formula (2) above include halides of benzophenone, 2-naphthyl phenyl ketone, and bis(2-naphthyl) ketone, and derivatives thereof.

Examples of the compound represented by Formula (3) above include hydroquinone, resorcinol, 2,6-naphthalenediol, 2,7-naphthalenediol, 1,5-naphthalenediol, 4,4'-dihydroxybiphenyl, 4,4'-dihydroxydiphenyl ether, 4,4'-dihydroxybenzophenone, 4,4'-dihydroxydiphenyl sulfide, 4,4'-dihydroxydiphenyl sulfone, bisphenol A, bisphenol F, bisphenol S, 2,5-dihydroxybiphenyl, and derivatives thereof.

Examples of the derivatives include compounds in which a substituent is bonded to an aromatic hydrocarbon group of the compound represented by Formula (2) above or the compound represented by Formula (3). Examples of the substituent include alkyl groups having from 1 to 6 carbons, alkoxy groups having from 1 to 6 carbons, and halogen atoms.

For the amounts of the compound represented by Formula (2) and the compound represented by Formula (3), typically, 1 mol or greater of the compound represented by Formula (2) is used relative to 1 mol of the compound represented by Formula (3), and it is desirable that the amount of the compound represented by Formula (2) is adjusted according to the average degree of polymerization of the molecular chain in a desired curable compound (1). For example, relative to 1 mol of the compound represented by Formula (3), approximately 1.2 mol (e.g., from 1.18 to 1.22 mol) of the compound represented by Formula (2) is preferably used in the case of the average degree of polymerization of 5, approximately 1.1 mol (e.g., from 1.08 to 1.12 mol) of the compound represented by Formula (2) is preferably used in the case of the average degree of polymerization of 10, and approximately 1.05 mol (e.g., from 1.04 to 1.06 mol) of the compound represented by Formula (2) is preferably used in the case of the average degree of polymerization of 20.

As the compound represented by Formula (2), at least a halide of benzophenone is preferably used, and the used amount of the halide of benzophenone is, for example, 10 mol % or greater, preferably 30 mol % or greater, particularly preferably 50 mol % or greater, and most preferably 80 mol % or greater, relative to the total used amount (100 mol %) of the compound represented by Formula (2). Note that the upper limit is 100 mol %.

As the compound represented by Formula (3), use of at least one compound selected from the group consisting of hydroquinone, resorcinol, 2,6-naphthalenediol, 2,7-naphthalenediol, 4,4'-dihydroxybiphenyl, 4,4'-dihydroxydiphenyl ether, 4,4'-dihydroxybenzophenone, 4,4'-dihydroxydiphenyl sulfide, 4,4'-dihydroxydiphenyl sulfone, and bisphenol A (especially, at least one selected from the group consisting of hydroquinone, resorcinol, and bisphenol A) is preferred. The total of used amounts of the compounds is, for example, 10 mol % or greater, preferably 30 mol % or greater, particularly preferably 50 mol % or greater, and most preferably 80 mol % or greater, relative to the total used amount (100 mol %) of the compound represented by Formula (3). Note that the upper limit is 100 mol %.

The reaction of the compound represented by Formula (2) above and the compound represented by Formula (3) are performed in the presence of a base (e.g., at least one selected from the group consisting of inorganic bases, such as sodium hydroxide, potassium hydroxide, calcium hydroxide, sodium carbonate, potassium carbonate, and sodium hydrogencarbonate, and organic bases, such as pyridine and triethylamine). The used amount of the base can be appropriately adjusted based on the type of the base. For example, the used amount of diacidic base, such as calcium hydroxide, is approximately from 1.0 to 2.0 mol relative to 1 mol of the compound represented by Formula (3).

Furthermore, this reaction can be performed in the presence of a solvent. As the solvent, for example, an organic solvent, such as N-methyl-2-pyrrolidone, dimethylformamide, dimethyl sulfoxide, acetone, tetrahydrofuran, or toluene, or a mixed solvent of two or more thereof can be used.

The used amount of the solvent is, for example, approximately from 5 to 20 times in weight relative to the total amount (weight) of the reaction base substances. The solvent, when used in an amount greater than the range described above, decreases the concentration of the reaction base substances and tends to decrease the reaction rate.

A reaction atmosphere is any atmosphere that does not inhibit the reaction and not particularly limited, and may be, for example, any of an air atmosphere, a nitrogen atmosphere, and an argon atmosphere.

The reaction temperature is, for example, approximately from 100 to 200° C. The reaction time is, for example, approximately from 5 to 24 hours. In addition, this reaction can be performed by any method, such as a batch method, a semi-batch method, and a continuous method.

After the completion of the reaction, the resulting reaction product can be separated and purified by a separation method, such as filtration, concentration, distillation, extraction, crystallization, adsorption, recrystallization, and column chromatography; and a separation method in combination thereof.

Step [2]

Examples of the compound represented by Formula (5) above include 4-aminophenol, 2-amino-6-hydroxynaphthalene, and regioisomers and derivatives thereof.

The used amount of the compound represented by Formula (5) above can be appropriately adjusted based on the average degree of polymerization of the molecular chain in a desired curable compound. For example, the amount may be adjusted to a range approximately from 0.4 to 0.6 mol relative to 1 mol of the compound represented by Formula (3) in the case of the average degree of polymerization of 5, approximately from 0.2 to 0.4 mol relative to 1 mol of the compound represented by Formula (3) in the case of the average degree of polymerization of 10, and approximately from 0.1 to 0.15 mol relative to 1 mol of the compound represented by Formula (3) in the case of the average degree of polymerization of 20.

Since a hydrogen halide is formed in the reaction as the reaction progresses, the reaction is preferably carried out in the presence of a base for trapping the formed hydrogen halide because the progress of the reaction can be effectively promoted. Examples of the base include inorganic bases, such as sodium hydroxide, potassium hydroxide, calcium hydroxide, sodium carbonate, potassium carbonate, and sodium hydrogencarbonate, and organic bases, such as pyridine and triethylamine. One of these can be used alone or two or more in combination.

The used amount of the base can be appropriately adjusted based on the type of the base. For example, the used amount of monoacidic base, such as sodium hydroxide, is approximately from 1.0 to 3.0 mol relative to 1 mol of the compound represented by Formula (5) above.

Furthermore, this reaction can be performed in the presence of a solvent. As the solvent, the same solvent used in Step [1] can be used.

The reaction temperature is, for example, approximately from 100 to 200° C. The reaction time is, for example, approximately from 1 to 15 hours. In addition, this reaction can be performed by any method, such as a batch method, a semi-batch method, and a continuous method.

After the completion of the reaction, the resulting reaction product can be separated and purified by a separation method, such as filtration, concentration, distillation, extraction, crystallization, adsorption, recrystallization, and column chromatography; and a separation method in combination thereof.

Step [3]

Examples of the cyclic acid anhydride (the compound represented by Formula (7) above) include maleic anhydride, 2-phenylmaleic anhydride, 4-phenylethynyl-phthalic anhydride, 4-(1-naphthylethynyl)-phthalic anhydride, and bicyclo[2.2.1]hept-5-ene-2,3-dicarboxylic anhydride, and derivatives thereof.

The used amount of the cyclic acid anhydride can be appropriately adjusted based on the average degree of polymerization of the molecular chain in a desired curable compound. For example, the amount may be adjusted to a range approximately from 0.4 to 0.8 mol relative to 1 mol of the compound represented by Formula (3) in the case of the average degree of polymerization of 5, approximately from 0.2 to 0.4 mol relative to 1 mol of the compound represented by Formula (3) in the case of the average degree of polymerization of 10, and approximately from 0.1 to 0.15 mol relative to 1 mol of the compound represented by Formula (3) in the case of the average degree of polymerization of 20.

This reaction can be performed in the presence of a solvent. As the solvent, the same solvent used in Step [1] can be used.

This reaction is preferably performed at room temperature (1 to 30° C.). The reaction time is, for example, approximately from 1 to 30 hours. In addition, this reaction can be performed by any method, such as a batch method, a semi-batch method, and a continuous method.

Furthermore, in this reaction, removal of water, formed as a by-product, by azeotropy using an azeotropic solvent of water (e.g., toluene) or by use of a dehydrating agent (e.g., acetic anhydride) is preferred from the perspective of promotion of the reaction progress. Furthermore, removal of formed water by a dehydrating agent is preferably performed in the presence of a basic catalyst (e.g., triethylamine).

After the completion of the reaction, the resulting reaction product can be separated and purified by a separation method, such as filtration, concentration, distillation, extraction, crystallization, adsorption, recrystallization, and column chromatography; and a separation method in combination thereof.

Radical Polymerization Initiator

The radical polymerization initiator is a compound that generates a free radical under heat treatment to promote polymerization reaction of a curable compound, and is a thermal radical polymerization initiator. The curable composition contains the radical polymerization initiator together with the curable composition described above, and thus an effect of lowering the curing start temperature to slow down the progress rate of the curing reaction is obtained while maintaining storage stability.

Examples of the radical polymerization initiator include peroxide group- or hydroperoxide group-containing compounds such as a peroxide, a percarboxylic acid, a peracid ester, a ketone peroxide, peroxyketal, diacyl peroxide, and peroxy carbonate; dibenzyl compounds such as diphenylbutane; an azo compound; an oxime ester compound; a benzoin compound; an acetophenone derivative; and the like. One of these can be used alone or two or more in combination.

As the radical polymerization initiator, among these, a peroxide group- or hydroperoxide group-containing compound is preferable in that a cured product having flexibility and excellent cracking resistance can be formed, and in particular, using a peroxide and/or a peracid ester is preferable in that a cured product having flexibility and excellent cracking resistance can be formed, and generation of voids in the cured product can be suppressed because gas is unlikely to be generated at the time of radical generation.

As the radical polymerization initiator, in particular, a peracid ester is preferably used. This is because the peracid ester has excellent solubility in the curable compound (in particular, the compound represented by Formula (1)). Furthermore, this is because the curable composition containing the peracid ester as the radical polymerization initiator has flexibility and excellent cracking resistance, and forms a cured product in which void generation is suppressed.

Examples of the peroxide include compounds represented by Formula (i-1) below.

[Chem. 15]

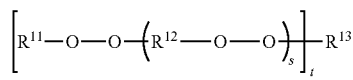

(i-1)

In the formula, $R^{11}$ represents a monovalent hydrocarbon group, $R^{12}$ represents a divalent hydrocarbon group, and $R^{13}$ represents a hydrogen atom or a t-valent hydrocarbon group. $R^{11}$ and $R^{12}$ or $R^{11}$ and $R^{13}$ may be bonded to each other to form a ring together with the adjacent —O—O— group. s represents an integer of 0 or greater, and t represents an integer of 1 or greater.

The monovalent hydrocarbon group in $R^{11}$ includes a monovalent aliphatic hydrocarbon group, a monovalent alicyclic hydrocarbon group, a monovalent aromatic hydrocarbon group, and a monovalent group formed by bonding two or more groups selected from the aforementioned groups.

Examples of the monovalent hydrocarbon group of $R^{11}$ include a linear or branched alkyl group having from 1 to 5 carbons, a linear or branched alkenyl group having from 2 to 5 carbons, a linear or branched alkynyl group having from 2 to 5 carbons, an cycloalkyl group having from 3 to 6 carbons, an aryl group having from 6 to 14 carbons, and a monovalent group formed by bonding two or more groups selected from these groups (e.g., $C_{7-15}$ aralkyl groups).

Examples of the divalent hydrocarbon groups of $R^{12}$ include a divalent aliphatic hydrocarbon group, a divalent alicyclic hydrocarbon group, a divalent aromatic hydrocarbon group, and a divalent group formed by bonding at least two groups selected from these groups.

Examples of the divalent hydrocarbon group of $R^{12}$ include a linear or branched alkylene group having from 1 to 5 carbons, a linear or branched alkenylene group having from 2 to 5 carbons, a linear or branched alkynylene group having from 2 to 5 carbons, a cycloalkylene group having from 3 to 6 carbons, an arylene group having from 6 to 14 carbons, and a divalent group formed by bonding two or more groups selected from these groups.

Examples of the t-valent hydrocarbon group of $R^{13}$ include a group in which (t-1) hydrogen atom(s) is removed from the structural formula of the monovalent hydrocarbon group.

The hydrocarbon group of $R^{11}$, $R^{12}$, and $R^{13}$ may have a substituent, and examples of the substituent include a hydroxyl group.

The above s represents an integer of 0 or greater, and is, for example, an integer of 0 to 3, and preferably an integer of 0 to 1.

The above t represents an integer of 1 or greater, and is, for example, an integer of 1 to 3, and preferably an integer of 1 to 2.

As the peroxide, in particular, a compound represented by Formula (i-1) in which at least one of $R^{11}$, $R^{12}$, or $R^{13}$ is an aralkyl group is preferred, and in particular, a compound in which $R^{11}$ and $R^{13}$ each are an aralkyl group is preferred.

As the peroxide, in particular, a compound represented by Formula (i-1) in which s=0 and t=1 are satisfied is preferred.

As the peroxide, among others, a compound represented by Formula (i-1-1) below is preferred.

[Chem. 16]

(i-1-1)

In the formula, $R^{14}$ and $R^{15}$ are identical or different and each represent an aralkyl group.

A one-minute half-life decomposition temperature of the peroxide (or a decomposition temperature to obtain a half-life of 1 minute) is, for example, 300° C. or lower. In particular, it is preferably 250° C. or lower, and particularly preferably 200° C. or lower in that the effect of lowering the curing start temperature of the curable composition is excellent, and a cured product excellent in flexibility is obtained. The lower limit of the one-minute half-life decomposition temperature is, for example, 100° C., preferably 140° C., and particularly preferably 150° C.

Examples of $R^{14}$ and $R^{15}$ in the above formula include $C_{7-15}$ aralkyl groups such as a phenylisopropyl group.

Examples of the peracid ester include compounds represented by Formula (i-2) below.

[Chem. 17]

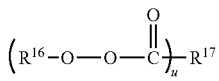

(i-2)

In the formula, $R^{16}$ represents a monovalent hydrocarbon group or a monovalent group in which two or more monovalent hydrocarbon groups are bonded via a linking group, and $R^{17}$ represents a u-valent hydrocarbon group or a u-valent group in which two or more hydrocarbon groups are bonded via a linking group. u represents an integer of 1 or greater.

The monovalent hydrocarbon group of $R^{16}$ takes the same examples as that for the monovalent hydrocarbon group of $R^{11}$.

The above u represents an integer of 1 or greater and is, for example, an integer of 1 to 3, and preferably an integer of 1 to 2.

Examples of the u-valent hydrocarbon group of $R^{17}$ include a group in which (u-1) hydrogen atom(s) is removed from the structural formula of the monovalent hydrocarbon group.

Examples of the linking group include an ether bond (—O—), and a carbonyl group.

As the peracid ester, in particular, a compound represented by Formula (i-2) in which $R^{16}$ is a monovalent aliphatic hydrocarbon group, and $R^{17}$ is a u-valent aromatic hydrocarbon group is preferred.

The peracid ester is, in particular, a compound represented by Formula (i-2) in which u=1 is satisfied is preferred.

A one-minute half-life decomposition temperature of the peracid ester (or a decomposition temperature to obtain a half-life of 1 minute) is, for example, 300° C. or lower. In particular, it is preferably 250° C. or lower, and particularly preferably 200° C. or lower in that the effect of lowering the curing start temperature of the curable composition is excellent, and a cured product excellent in flexibility is obtained. The lower limit of the one-minute half-life decomposition temperature is, for example, 100° C., preferably 140° C., and particularly preferably 150° C.

In the curable composition, the content of the radical polymerization initiator is, for example, from 0.1 to 30.0 wt.

%, preferably from 0.2 to 5.0 wt. %, particularly-preferably from 0.3 to 3.0 wt. %, and most preferably from 0.4 to 2.0 wt. % of the curable compound (in particular, the compound represented by Formula (1) above).

In a case where the radical polymerization initiator is a peroxide, the content of the radical polymerization initiator is, for example, from 0.1 to 30.0 wt. %, preferably from 0.2 to 5.0 wt. %, particularly preferably from 0.3 to 4.0 wt. %, most preferably from 0.4 to 3.0 wt. %, and particularly preferably from 0.5 to 2.0 wt. % of the curable compound (in particular, the compound represented by Formula (1) above).

In a case where the radical polymerization initiator is an peracid ester, the content of the radical polymerization initiator is, for example, from 0.1 to 30.0 wt. %, preferably from 0.2 to 5.0 wt. %, particularly preferably from 0.4 to 4.0 wt. %, and most preferably from 0.5 to 2.0 wt. % of the curable compound (in particular, the compound represented by Formula (1) above).

When the content of the radical polymerization initiator is too low, the effect of lowering the curing start temperature is poor. Furthermore, the curing reaction is stopped without being completed, and there is a tendency that it is difficult to obtain a cured product having excellent flexibility. On the other hand, when the content of the radical polymerization initiator is excessive, heat resistance and flexibility of the obtained cured product tend to be reduced.

Additional Component

The curable composition may contain another component as necessary in addition to the compound represented by Formula (1) and the radical polymerization initiator. Examples of the other component include curing agents, catalysts, fillers, organic resins (such as silicone resins, epoxy resins, and fluororesins), solvents, stabilizers (such as antioxidants, ultraviolet absorbers, light-resistant stabilizers, and heat stabilizers), flame retardants (such as phosphorus-based flame retardants, halogen-based flame retardants, and inorganic flame retardants), flame retardant aids, reinforcing materials, nucleating agents, coupling agents, lubricants, waxes, plasticizers, release agents, impact resistance modifiers, hue modifiers, fluidity improvers, colorants (such as dyes and pigments), dispersants, anti-foaming agents, defoaming agents, antimicrobial agents, preservatives, viscosity modifiers, and thickeners. One type alone or two or more types thereof in combination can be used.

As the solvent, for example, ketones, amides, halogenated hydrocarbons, sulfoxides, ethers, esters, nitriles, aromatic hydrocarbons, and liquid mixtures of two or more of these are preferred, at least one solvent selected from the group consisting of ethers, ketones, amides, halogenated hydrocarbons, and sulfoxides is particularly preferred, and at least one solvent selected from the group consisting of ethers, amides, halogenated hydrocarbons, and sulfoxides is especially preferred.

The filler include organic fillers and inorganic fillers. Examples of a raw material of the filler include carbon materials (such as carbon black, artificial graphite, expandable graphite, natural graphite, coke, carbon nanotubes, and diamond), carbon compounds (such as silicon carbide, fluorine carbide, boron carbide, tungsten carbide, and titanium carbide), nitrogen compounds (such as boron nitride, aluminum nitride, titanium nitride, carbon nitride, and silicon nitride), minerals or ceramics (such as talc, mica, zeolite, ferrite, tourmaline, diatomaceous earth, fired diatomaceous earth, kaolin, sericite, bentonite, smectite, clay, silica, quartz powder, glass beads, glass powder, glass flake, milled fiber, and wollastonite), elementary metal or alloy (such as metal silicon, iron, copper, magnesium, aluminum, gold, silver, platinum, zinc, manganese, and stainless steel), metal oxides (such as silica, alumina, zirconia, magnesia, zinc oxide, and beryllium oxide), metal hydroxides (such as aluminum hydroxide, calcium hydroxide, and magnesium hydroxide), and carbonates (such as magnesium carbonate and calcium carbonate).

The content of the filler is in a range of, for example, 0.1 to 50 wt. %, or, for example, 0.1 to 50 vol. % of the total amount of the curable composition and can be appropriately adjusted based on the use.

The curable composition contains at least the compound represented by Formula (1) above as the curable compound. Furthermore, the curable composition may include a curable compound other than the compound represented by Formula (1) above; however, the proportion of the compound represented by Formula (1) above in the total amount (100 wt. %) of curable compounds in the curable composition is, for example, 70 wt. % or greater, preferably 80 wt. % or greater, and particularly preferably 90 wt. % or greater. Note that the upper limit is 100 wt. %. Accordingly, the content of the curable compound other than the compound represented by Formula (1) above is, for example, 30 wt. % or less, preferably 20 wt. % or less, and particularly preferably 10 wt. % or less in the total amount (100 wt. %) of the curable compounds in the curable composition.

The content (total amount when two or more types are contained) of other components (in particular, other non-volatile components) is, for example, 50 wt. % or less, preferably 40 wt. % or less, more preferably 30 wt. % or less, particularly preferably 20 wt. % or less, most preferably 10 wt. % or less, and especially preferably 5 wt. % or less of the total amount of the curable composition.

Furthermore, the content (total amount when two or more types are contained) of other components (in particular, other non-volatile components) is, for example, 50 wt. % or less, preferably 40 wt. % or less, more preferably 30 wt. % or less, particularly preferably 20 wt. % or less, most preferably 10 wt. % or less, and especially preferably wt. % or less of the total amount of the non-volatile components contained in the curable composition.

The curable composition contains the compound represented by Formula (1) above, and the compound represented by Formula (1) above has a low melting temperature and excellent solvent solubility, and thus the curable composition has excellent workability. Furthermore, even when heating at a low temperature, it is possible to proceed with and complete the curing reaction. Thus, it is possible to form a cured product having excellent flexibility.

Furthermore, the cured product of the curable composition has super heat resistance, flame retardance, and good dielectric properties (low relative permittivity and dielectric loss tangent).

When the heating temperature and heating time are adjusted to stop curing reaction in the middle of the reaction without completing the reaction, the curable composition can form a semi-cured product (B-stage).

The curable composition described above can be suitably used as molding materials (such as a sizing agent) for composite materials (such as fiber-reinforced plastics and prepregs) to be used in a severe environmental temperature condition, such as those for electronic information devices, household appliances, automobiles, precision machines, aircraft, devices for aerospace industry, and energy field (oil drill pipes/tubes and fuel containers), and as functional materials, such as shielding materials, conductive materials (such as thermally conductive materials), insulating materials, and adhesive agents (such as heat-resistant adhesive agents). In addition, the curable composition can be suitably used as sealing agents, paints, coating agents, inks, sealants, resists, shaping materials, and forming materials [forming materials for automobile components, such as thrust washers, oil filters, seals, bearings, gears, cylinder head covers, bearing retainers, intake manifolds, and pedals; components of semiconductor and liquid crystal producing apparatuses, such as base materials, electrical insulation materials (such as electrical insulation films), laminated plates, electronic papers, touch panels, solar cell substrates, optical waveguides, light guide plates, holographic memories, silicon wafer carriers, IC chip trays, electrolytic capacitor trays, and insulating films; optical components, such as lenses; compressor components, such as pumps, valves, and seals; cabin interior components of aircraft; medical instrument components and components of food and beverage producing facilities, such as sterilized instruments, columns, and piping; and members for electric and electronic devices as represented by housings for use in personal computers and cell phones, and keyboard supporters, which are members for supporting keyboards inside personal computers].

The curable composition can be suitably used, in particular, as a sealing agent that covers a semiconductor element in a highly heat-resistant and highly voltage-resistant semiconductor device (such as power semiconductor), for which employment of a known resin material has been difficult.

Furthermore, the curable composition can be suitably used as an adhesive agent [e.g., heat-resistant adhesive agent used for laminating a semiconductor in a highly heat-resistant and highly voltage-resistant semiconductor device (such as power semiconductor)].

Furthermore, the curable composition can be suitably used as a paint (or powder paint) [e.g., paint (or powder paint) used for a highly heat-resistant and highly voltage-resistant semiconductor device (such as power semiconductor)].

Cured Product and Semi-Cured Product

The cured product (or the semi-cured product) is a cured product (or a semi-cured product) of the curable composition described above.

The cured product (or the semi-cured product) can be produced by subjecting the curable composition to heat treatment. The curable composition contains the radical polymerization initiator, and thus the curing start temperature can be lowered as compared to a case where no radical polymerization initiator is contained, and the heat treatment temperature is, for example, 260° C. or lower and preferably 240° C. or lower (preferably 200 to 240° C.).

Note that the heat treatment may be performed while the temperature is maintained constant or may be performed by changing the temperature stepwise. The heat treatment temperature can be appropriately adjusted depending on the heating time and, for example, in a case where the heating time is desirably shortened, the heating temperature is preferably set high.

Curing of the curable composition can be performed under normal pressure, under reduced pressure, or under pressurization.

The curable composition contains the compound represented by Formula (1) as a curable compound, and because the compound represented by Formula (1) has a high proportion of the structure derived from an aromatic ring, a cured product (specifically, a cured product having super heat resistance) can be formed without causing decomposition even when heating is performed at a high temperature, and a cured product can be efficiently formed with superior working efficiency by heating at a high temperature for a short period of time. Furthermore, the heating means is not particularly limited, and a known and common means can be used.

When the heating temperature and heating time are adjusted to stop curing reaction of the curable composition in the middle of the reaction without completing the reaction, a semi-cured product (B-stage) can be produced. The degree of cure of the semi-cured product is, for example, 85% or less (e.g., from 10 to 85%, particularly preferably from 15 to 75%, and even more preferably from 20 to 70%).

Note that the degree of cure of the semi-cured product can be calculated from the following equation by measuring the calorific value of the curable composition and the calorific value of the semi-cured product thereof by DSC.

Degree of cure (%)=[1−(calorific value of semi-cured product/calorific value of curable composition)]×100

The semi-cured product temporarily exhibits fluidity by heating and can conform to a step having a height difference. Furthermore, by performing heat treatment, a cured product having excellent heat resistance can be formed.

Furthermore, the cured product has a 5% weight loss temperature ($T_{d5}$) of 300° C. or higher, and a nitrogen atom content of the cured product after being subjected to heat treatment at 320° C. for 30 minutes is from 2.8 to 0.1 wt. %.

The 5% weight loss temperature ($T_{d5}$) of the cured product measured at a temperature increase rate of 10° C./min (in nitrogen) is, for example, 300° C. or higher, preferably 400° C. or higher, particularly preferably 450° C. or higher, and most preferably 500° C. or higher. The upper limit of the 5% weight loss temperature ($T_{d5}$) is, for example, 600° C., preferably 550° C., and particularly preferably 530° C.

A 10% weight loss temperature ($T_{d10}$) of the cured product measured at a temperature increase rate of 10° C./min (in nitrogen) is, for example, 300° C. or higher, preferably 400° C. or higher, particularly preferably 480° C. or higher, and most preferably 500° C. or higher. The upper limit of the 10% weight loss temperature ($T_{d10}$) is, for example, 600° C., and preferably 550° C.

Note that the 5% weight loss temperature and the 10% weight loss temperature can be measured by thermogravimetry/differential thermal analysis (TG/DTA).

Furthermore, the nitrogen atom content of the cured product after being subjected to heat treatment at 320° C. for 30 minutes is, for example, from 2.8 to 0.1 wt. %, preferably from 2.5 to 0.15 wt. %, more preferably from 2.0 to 0.20 wt. %, particularly preferably from 1.8 to 0.40 wt. %, and most preferably from 1.5 to 0.70 wt. %. Thus, the cured product has excellent toughness and heat resistance. On the other hand, when the nitrogen atom content is less than the range described above, the toughness and heat resistance of the cured product tend to decrease.

The nitrogen atom content in the cured product after being subjected to heat treatment can be determined by, for example, CHN elemental analysis.

The cured product may contain other additives besides a cross-linked structural body of the curable compound; however, when the cured product is subjected to heat treatment at 320° C. for 30 minutes, additives having decomposition points or boiling points of lower than 320° C. are decomposed and disappear, and thus only the cross-linked structural body of the curable compound remains. Therefore, the nitrogen atom content in the cured product after the heat treatment can be estimated as the content of nitrogen atoms included in the cross-linked structural body of the curable compound. Note that, from the perspective of thermal history, heat treatment can be employed as the curing treatment.

Further, the cured product has a peak in a region of 1620 to 1750 cm$^{-1}$ of an IR spectrum. The peak is originated from the "—C(=O)—N—C(=O)—" unit.

Furthermore, the cured product has excellent flame retardance, and non-flammability of a cured product having a thickness of 0.15 mm, measured by a method in accordance with UL94V, is V-1 grade, that is, satisfies the following conditions 1 to 5.

(1) Burning duration is 30 seconds or less.

(2) Total burning duration of 5 samples is 250 seconds or less.

(3) Burning and afterglow duration after second flame application is 60 seconds or less.

(4) Combustion up to holding clamp does not occur.

(5) Burning particles do not drop and ignition of cotton batting does not occur.

The cured product has excellent insulation properties, and the relative permittivity thereof is, for example, 6 or less (e.g., 1 to 6), preferably 5 or less (e.g., 1 to 5), and particularly preferably 4 or less (e.g., 1 to 4). The dielectric loss tangent is, for example, 0.05 or less (e.g., 0.0001 to 0.05), preferably from 0.0001 to 0.03, and particularly preferably from 0.0001 to 0.015.

Note that the "relative permittivity" and "dielectric loss tangent" described above are values measured at a measurement frequency of 1 MHz and a measurement temperature of 23° C. in accordance with JIS-C2138 or values measured at a frequency of 1 GHz at 23° C. in accordance with ASTM D2520.

Structural Body

The structural body is a structural body containing the cured product or semi-cured product. The shape of the structural body is not particularly limited, but is, for example, particulate or planar. The structural body can be produced by subjecting the curable composition to a molding method such as injection molding, transfer molding, compression molding, or extrusion molding.

The structural body has excellent heat resistance and flame retardance. Furthermore, the relative permittivity and dielectric loss tangent are low. Therefore, the structural body can be suitably used as a material for replacing a metal, such as iron and aluminum, in the fields of housing and building, sporting goods, automobiles, and aircraft and aerospace industry. Furthermore, the structural body can be suitably used as a structural body to be provided at a place where flame retardance is required by the Fire Service Act, such as high-rise buildings, underground, theaters, and vehicles. In particular, a structural body in a planer form can be suitably used as an interlayer insulating film of an electric device.

[Laminate]

The laminate has a configuration in which a cured product or a semi-cured product of the curable composition and a substrate are laminated. The laminate includes configurations that are the cured product or semi-cured product of the curable composition/substrate and the substrate/cured product or semi-cured product of the curable composition/substrate.

The laminate can be produced, for example, by applying the curable composition on the substrate and performing heat treatment.

The laminate can also be produced by applying the curable composition on a support, performing heat treatment to semi-cure the curable composition, peeling, from the support, the obtained semi-cured product, placing the semi-cured product on a substrate, and further performing heat treatment.

Examples of the materials of the substrate include semiconductor materials (such as ceramics, SiC, and gallium nitride), paper, coated paper, plastic films, wood, fabric, nonwoven fabric, and metals (such as stainless steel, aluminum alloy, and copper).

The curing reaction of the curable composition can be completed even at a low heating temperature, and thus a support made of a plastic (e.g., a support made of polyimide or fluororesin) can be used. For example, when a plastic belt of a belt conveyor is used as the support, the laminate can be continuously produced on a production line including the belt conveyor.

Furthermore, the curable composition has a small cure shrinkage and excellent shape stability. Therefore, by uniformly applying the curable composition on a support or the like, a thin film having a smooth surface can be obtained, and by curing this thin film, a cured product or semi-cured product having excellent surface smoothness can be formed. Therefore, the cured product or semi-cured product suitably adheres to a surface of a substrate having low flexibility or low shape conformity and thus can firmly adheres to the substrate.

In a case where the laminate has a configuration of a cured product/substrate or a substrate/cured product/substrate, excellent adhesion between the cured product and the substrate is achieved. The tensile shear strength (in accordance with JIS K 6850 (1999)) between the substrate and the cured product is, for example, 1 MPa or greater, preferably 5 MPa or greater, and particularly preferably 10 MPa or greater. Note that the tensile shear strength can be measured by a tensile tester (Orientec Corporation, TENSILON UCT-ST) at a pulling speed of 300 mm/min and a peeling angle of 180°.

The laminate has a configuration in which the substrates are laminated with the cured product having excellent heat resistance, flame retardance, and insulation properties interposed therebetween. Thus, the laminate can be suitably used as, for example, an electronic circuit board.

Composite Material

The composite material includes a cured product or a semi-cured product of the curable composition and a fiber. The shape of the composite material is not particularly limited, and examples thereof include a fiber form and a sheet form.

Examples of the fiber include carbon fibers, aramid fibers, and glass fibers. One of these can be used alone or two or more in combination. The fiber may be processed into a thread form or a sheet form (woven fabric or nonwoven fabric).

The composite material can be produced by, for example, impregnating the fiber with the curable composition and performing heat treatment to cure or semi-cure the impregnated curable composition. The composite material obtained by semi-curing the impregnated curable composition can be suitably used as an intermediate product, such as a prepreg.

The composite material has a configuration in which the compound represented by Formula (1) and included in the curable composition is incorporated into gaps between fibers to form a cross-linked structural body, and has a light weight and high strength as well as excellent heat resistance, flame retardance, and insulation properties. Therefore, the composite material can be suitably used as a material for replacing a metal, such as iron and aluminum, in the fields of housing and building, sporting goods, automobiles, and aircraft and aerospace industry. In addition, for example, the composite material can be suitably used as clothing material for fire fighting (fire fighting clothing, clothing for activity, clothing for rescue and heat resistant clothing); curtains and floor covering materials to be provided at a place where flame retardance is required by the Fire Service Act, such as high-rise buildings, underground, theaters, and vehicles; separators, such as separators for secondary batteries and separators for fuel cells; filters, such as industrial filters, filters for vehicles, and medical filters; and aerospace materials.

Each of the configurations, their combinations, and the like of the present disclosure above is an example, and addition, omission, substitution, and change of the configuration can be appropriately made without departing from the gist of the present disclosure. In addition, the present disclosure is not limited by the embodiments and is limited only by the claims.

EXAMPLES

Hereinafter, the present disclosure will be described more specifically with reference to examples, but the present disclosure is not limited by these examples.

Note that the measurements were performed under the following conditions.

NMR Measurement
  Measurement instrument: BRUKER 400 MHz/54 mm or BRUKER AVANCE 600 MHz
  Measurement solvent: deuterated DMSO, deuterated chloroform or a liquid mixture of deuterated chloroform/pentafluorophenol (PFP)=2/1 (wt/wt)
  Chemical shift: TMS as the reference GPC Measurement
  Apparatus: pump "LC-20AD" (available from Shimadzu Corporation)
  Detector: RID-10A (available from Shimadzu Corporation) or TDA-301 and UV 2501 (available from Viscotek Corporation)
  Solvent: THF or chloroform
  Columns: Shodex GPC K-806L×1+Shodex GPC K-803× 1+Shodex GPC K-801×2
  Flow rate: 1.0 mL/min
  Temperature: 40° C.
  Sample concentration: 0.1% (wt/vol)
  calibrated with polystyrene standard DSC Measurement
  Instrument: TA Q20
  Rate of temperature increase: 10° C./min
  Atmosphere: nitrogen atmosphere TG/DTA Measurement
  Instrument: NETZSCH TG209 F3
  Rate of temperature increase: 10° C./min
  Atmosphere: nitrogen atmosphere IR Measurement
  Instrument: Perkin Elmer Spectrum RX1 (ATR method)

Preparation Example 1

Preparation of Diamine (1)

In a 500 mL (three-necked) flask equipped with an agitation apparatus, a nitrogen introducing tube, and Dean-Stark apparatus, 27.50 g of 4,4'-difluorobenzophenone, 23.98 g of bisphenol A, 21.77 g of anhydrous potassium carbonate ($K_2CO_3$), 220 mL of N-methyl-2-pyrrolidone, and 110 mL of toluene were charged and heated while agitated in a nitrogen atmosphere, and toluene was refluxed at 130 to 140° C. for 4 hours. Thereafter, further heating was performed to distill off toluene at 170 to 180° C. Furthermore, after the agitation was continued at 170 to 180° C. for 10 hours, the temperature was lowered to room temperature.

Figure 2:
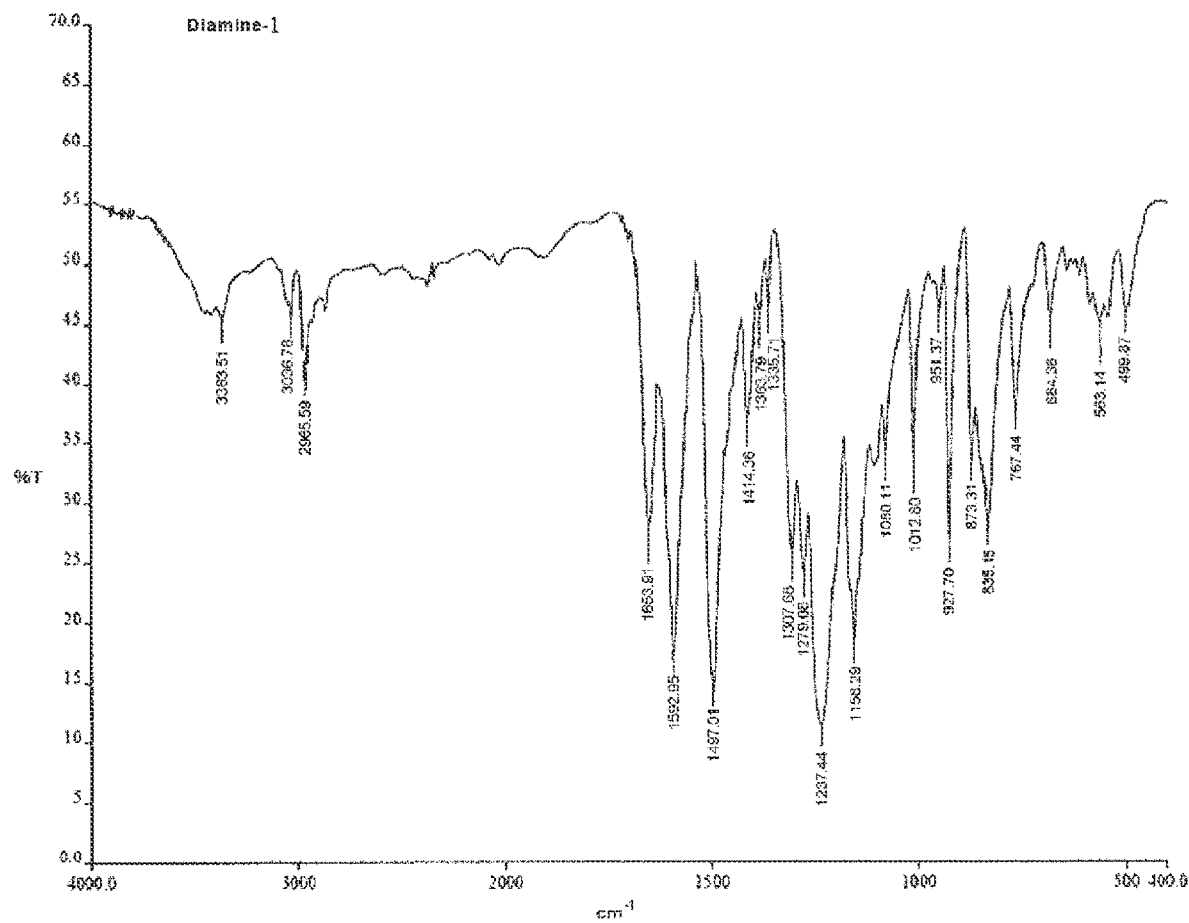
FIG. 2 is a diagram showing an FTIR spectrum of diamine (1) prepared in Preparation Example.

In the flask containing the obtained product, 5.04 g of 4-aminophenol, 6.39 g of anhydrous potassium carbonate, 30 mL of N-methyl-2-pyrrolidone, and 150 mL of toluene were added and heated again while agitated in a nitrogen atmosphere, and toluene was refluxed at 130 to 140° C. for 3 hours. Thereafter, heating was performed to distill off toluene at 170 to 180° C., and agitation was continued for 4 hours while the temperature of 170 to 180° C. was further maintained. The mixture was then cooled to room temperature, and the reaction solution was added to 3000 mL of methanol and filtered, and thus a powdery solid was obtained. After this powdery solid was repeatedly washed with methanol and water, the powdery solid was dried at 100° C. under reduced pressure for 8 hours, and thus a powdery solid was produced (diamine (1), compound represented by the following formula, yield: 95%). The resulting powdery solid was subjected to GPC measurement (solvent: THF, calibrated with polystyrene standard), and thus determined number average molecular weight was 2920, weight average molecular weight was 5100, and average degree of polymerization (m-2) was 6.2. The $^1$H-NMR spectrum and FTIR spectrum of the obtained diamine (1) are shown in FIG. 1 and FIG. 2, respectively.

[Chem. 18]

Diamine-1

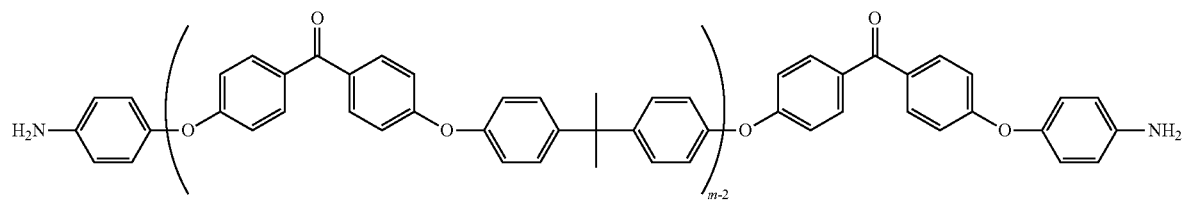

Preparation of Curable Compound A

Figure 3:
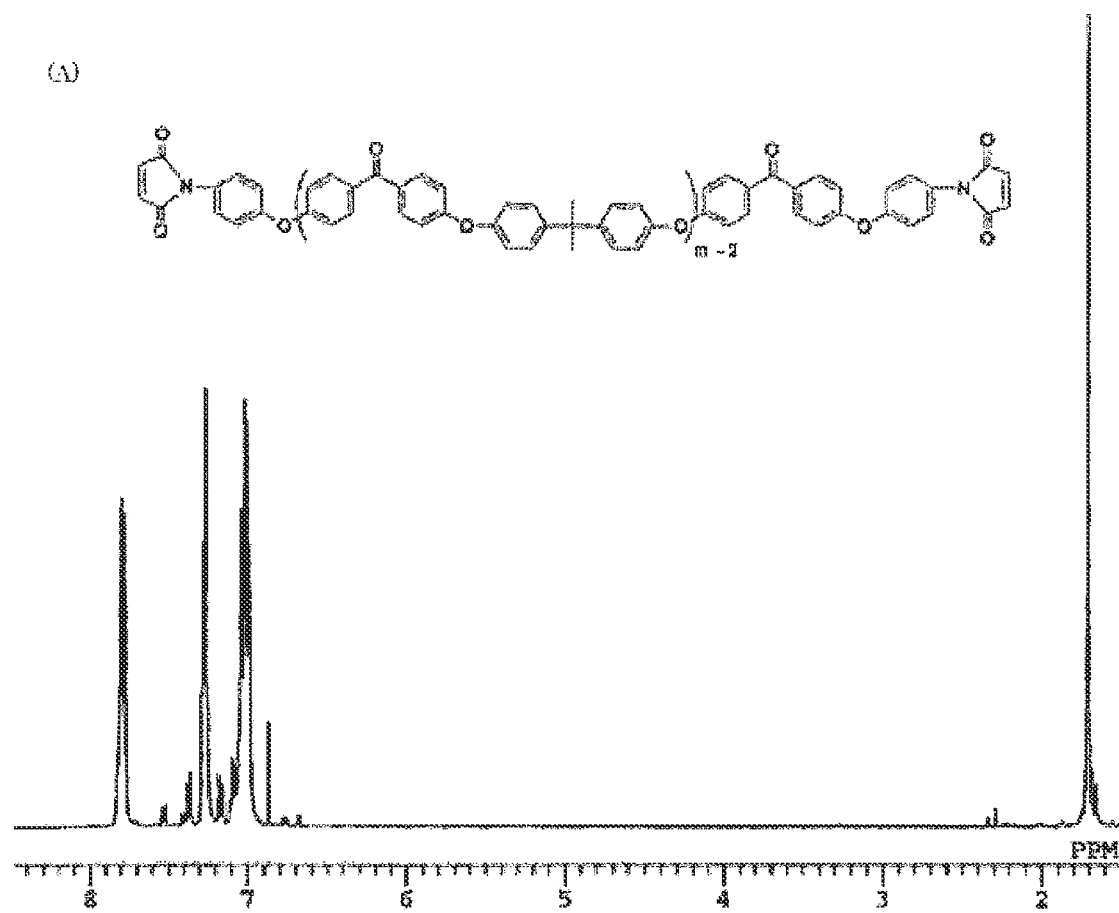
FIG. 3 is a diagram showing a $^1$H-NMR spectrum (CDCl$_3$) of a curable compound A prepared in Preparation Example.
Figure 4:
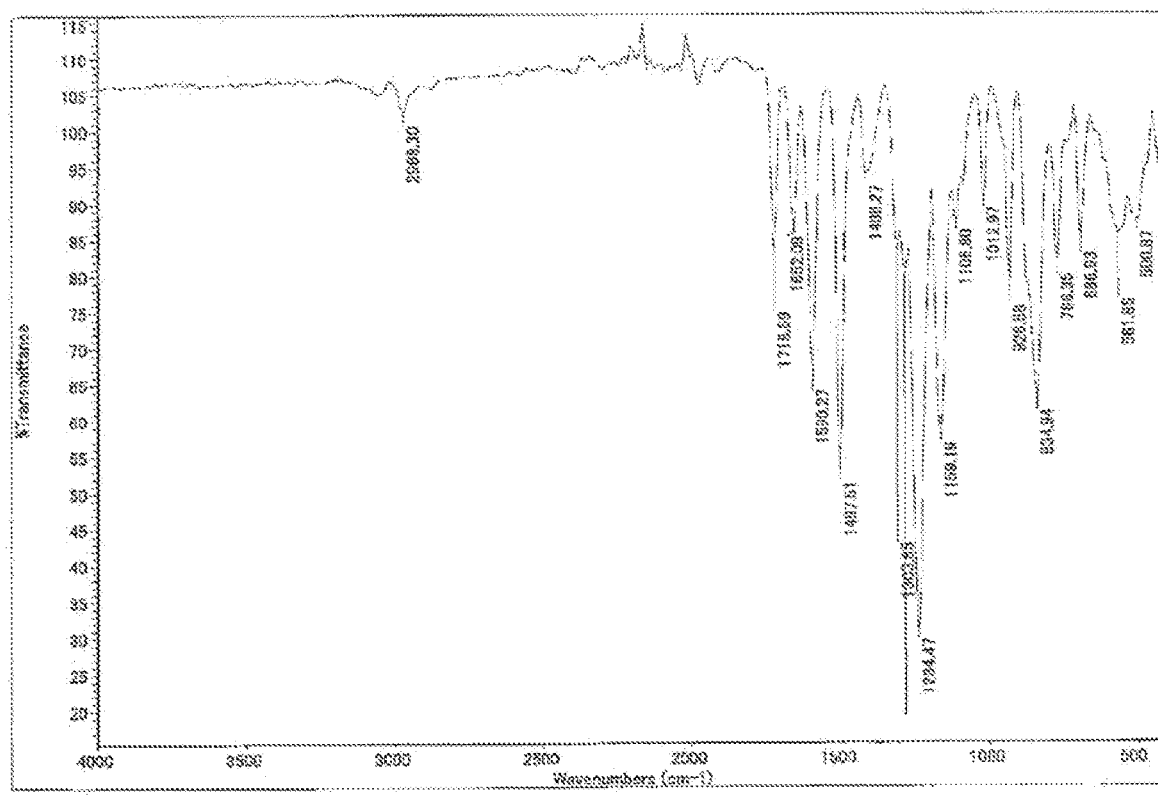
FIG. 4 is a diagram showing an FTIR spectrum of the curable compound A prepared in Preparation Example.

In a 1000 mL (three-necked) flask equipped with an agitation apparatus, a nitrogen introducing tube, and a drying tube, 5.88 g of maleic anhydride, 50 mL of N-methyl-2-pyrrolidone, and 200 mL of toluene were charged, and the flask was purged with nitrogen. A solution prepared by dissolving 48.57 g of the obtained diamine (1) in 330 mL of NMP was added thereto and agitated at room temperature in a nitrogen atmosphere for 24 hours. Thereafter, 0.761 g of p-toluenesulfonic acid monohydrate was added and heated to 140° C., and agitation was continued for 8 hours, and toluene was refluxed and water was removed. After the reaction solution was cooled to room temperature, and the reaction solution was added to 3000 mL of methanol and filtered, and thus a powdery solid was obtained. After this powdery solid was repeatedly washed with methanol and water, the powdery solid was dried at 100° C. under reduced pressure for 8 hours, and a powdery solid (curable compound A, compound represented by Formula (A) below, proportion of the structure derived from an aromatic ring: 71 wt. %, yield: 90%) was obtained. The $^1$H-NMR spectrum and FTIR spectrum of the curable compound A are shown in FIG. 3 and FIG. 4, respectively.

$^1$H-NMR (CDCl$_3$) δ: 1.71 (s), 6.87 (s), 7.02 (m), 7.09 (m), 7.17 (d, J=8.8 Hz), 7.26 (m), 7.37 (d, J=8.8 Hz), 7.80 (m)

[Chem. 19]

(A)

[Chemical structure diagram]

Furthermore, the viscosity of the curable compound A at 200° C. as measured by a rheometer was 14 Pa·s.

Furthermore, the number average molecular weight and the weight average molecular weight of the obtained curable compound A were determined by GPC measurement (solvent: THF, calibrated with polystyrene standard). The result shows that the number average molecular weight (Mn) was 3160, and the weight average molecular weight (Mw) was 5190.

Furthermore, Tg of the obtained curable compound A was determined by DSC measurement. The result shows that Tg was 131° C.

The solvent solubility of the curable compound A was measured by the following method.

The curable compound A was mixed with a solvent (100 g) shown in the following table and agitated at 25° C. for 24 hours, and its solubility in the solvent was evaluated based on the following criteria. For Reference Example, the solubility of PEEK (commercially available PEEK powder, polyether ether ketone, VICTREX 151G, melting point: 343° C., Tg: 147° C.) was evaluated in the same manner.

Evaluation Criteria

Good: Completely dissolved

Poor: At least a portion remained undissolved

The results are summarized and shown in the table below.

TABLE 1

| | Solvent | | | |
|---|---|---|---|---|
| Curable compound | NMP | DMSO | Chloroform | THF |
| Curable compound A | Good | Good | Good | Good |
| PEEK | Poor | Poor | Poor | Poor |

Solvent NMP: N-methyl-2-pyrrolidone
DMSO: Dimethyl sulfoxide
THF: Tetrahydrofuran Example 1

As described in the table below, 50 parts by weight of the curable compound A obtained in Preparation Example and 50 parts by weight of toluene were mixed and agitated at room temperature for 8 hours, and the curable compound A was completely dissolved. 0.5 parts by weight of t-butyl peroxy benzoate (trade name "Perbutyl Z", available from Nippon Oil & Fats Co., Ltd.) was blended thereto as a radical polymerization initiator, mica is further blended thereto in a proportion of 20 vol. % (41 wt. %) with respect to the curable composition A, the mixture was agitated, and a curable composition was obtained.

Examples 2 to 8

Curable compositions were obtained in the same manner as in Example 1 except for changing the types and contents of the radical polymerization initiator as described in the following table.

Comparative Example 1

A curable composition was obtained in the same manner as in Example 1 except that no radical polymerization initiator was added.

Comparative Example 2

Comparative Example 2 was performed in the same manner as in Example 1 except that as the curable compound, PEEK (commercially available PEEK powder, polyether ether ketone, VICTREX 151G, melting point: 343° C., Tg: 147° C., T$_{d5}$ of a cured product made of homopolymer of PEEK: 559° C.) was used. As a result, PEEK was not dissolved in the solvent even after heated and agitated at 140° C. for 5 minutes, and a uniform curable composition failed to be formed.

The curable compositions obtained in Examples 1 to 8 and Comparative Example 1 were evaluated for the following.

Storage Stability

Each of the obtained curable compositions was left to stand under conditions of 25° C. and 50 R % H for 12 hours, a viscosity increase of the composition after standing [=(viscosity of the composition after standing/viscosity of the composition before standing)×100] was calculated, and storage stability was evaluated according to the following criteria.

Evaluation Criteria of Storage Stability

Good: Viscosity increase of less than 10%

Marginal: Viscosity increase of 10% or more and less than 50%

Poor: Viscosity increase of 50% or more

Note that the viscosity (Pa·s) of the composition can be measured using a rheometer (trade name "PHYSICA UDS200", available from Anton Paar) at a temperature of 25° C. and a rotation speed of 20 revolutions/second.

Thermogravimetric Analysis of Cured Product

The obtained curable composition was placed on a glass plate so that it has a uniform thickness of approximately 0.5 mm, and heated in a muffle furnace (temperature was increased from 25° C. to 371° C. at 10° C./min and then maintained at 371° C. for 2 hours) to cure the curable composition, and a cured product was obtained.

The thermogravimetric analysis of the obtained cured product was performed by using TG/DTA, and the 5% weight loss temperature ($T_{d5}$) and 10% weight loss temperature ($T_{d10}$) were determined.

Nitrogen Atom Content

The nitrogen atom content was determined by subjecting the cured product obtained in a similar manner to the above section of Thermogravimetric Analysis of Cured Product to CHN elemental analysis. Note that antipyrine was used as a reference material.

Flexibility

The obtained curable composition was spread uniformly on a copper foil. (thickness: 18 μm), and subjected to primary drying (drying in a dryer at 60° C. for 2 hours), and a coating film (thickness: 50 μm) was obtained. The obtained coating film was heat-cured (in a dryer at 200° C. or 240° C. in a vacuum for 1 hour), and a cured product/copper foil laminate was obtained.

For the obtained laminate (length×width×thickness=100 mm×100 mm×50 μm), a bending tester (trade name "Mandrel bending tester", available from Toyo Seiki Seisaku-sho, Ltd.) was used to conduct a flexibility test by a method in accordance with JIS K5600-5-1 (flexibility (cylindrical mandrel)) using mandrels with a diameter of 3 mm and a diameter of 5 mm. The flexibility was evaluated using the following criteria.

Evaluation Criteria for Flexibility
   Good: No crack was generated in the laminate for both the diameter of 3 mm and the diameter of 5 mm.
   Marginal: No crack was generated in the laminate for the diameter of 5 mm, but a crack was generated in the laminate for the diameter of 3 mm.
   Poor: A crack was generated in the laminate even for the diameter of 5 mm.

The results are summarized and shown in the table below.

Radical Polymerization Initiator:
   t-butyl peroxy benzoate; peracid ester, decomposition temperature for one minute half-life: 166° C., trade name "Perbutyl Z", available from Nippon Oil & Fats Co., Ltd.
   Dicumyl peroxide: Peroxide, decomposition temperature for one minute half-life: 175° C., trade name: "PERCUMYL D", available from Nippon Oil & Fats Co., Ltd.
   2,3-dimethyl-2,3-diphenylbutane; decomposition temperature for one minute half-life: 285° C., trade name "Nofmer BC", available from Nippon Oil & Fats Co., Ltd.

The curable compositions obtained in Examples had excellent curability, and the cured products obtained by heat-curing the compositions at 240° C. had excellent flexibility.

The curable composition obtained in Examples had excellent curability as described above, and also had storage stability.

Further, the curable composition containing a peracid ester or a peroxide as the radical polymerization initiator is particularly excellent in the effect of lowering the curing temperature, and it was capable of forming a cured product having excellent flexibility even when being heated at 200° C.

On the other hand, the curable composition of Comparative Example 1 in which no radical polymerization initiator was used had storage stability, but was inferior in curability, and the cured product obtained by heating the composition at 200° C. or 240° C. did not have flexibility.

As a summary of the above, configurations and variations of the present disclosure are described below.

[1] A curable composition including a curable compound represented by Formula (1) and a radical polymerization initiator.

[2] The curable composition according to [1], wherein the radical polymerization initiator is a peroxide or an peracid ester.

[3] The curable composition according to [1] or [2], wherein $R^1$ and $R^2$ in Formula (1) are identical or different, and each are a curable functional group having a cyclic imide structure.

[4] The curable composition according to [1] or [2], wherein $R^1$ and $R^2$ in Formula (1) are identical or different, and each are a group selected from groups represented by Formulas (r-1) to (r-6).

TABLE 2

|  | Radical polymerization initiator | Content of radical polymerization initiator (wt. %) | Storage stability of curable composition | Evaluation of cured product | | | | |
|---|---|---|---|---|---|---|---|---|
|  |  |  |  | N content (wt. %) | $T_{d5}$ (° C.) | $T_{d10}$ (° C.) | Flexibility 240° C. curing | Flexibility 200° C. curing |
| Example 1 | t-butyl peroxybenzoate | 2 | Good | 0.95 | 501 | 525 | Good | Good |
| Example 2 | t-butyl peroxybenzoate | 1 | Good | — | 501 | 525 | Good | Good |
| Example 3 | t-butyl peroxybenzoate | 0.5 | Good | — | 501 | 525 | Good | Good |
| Example 4 | Dicumyl peroxide | 3 | Good | — | 501 | 525 | Good | Good |
| Example 5 | Dicumyl peroxide | 2 | Good | — | 501 | 525 | Good | Good |
| Example 6 | Dicumyl peroxide | 1 | Good | — | 501 | 525 | Good | Marginal |
| Example 7 | Dicumyl peroxide | 0.5 | Good | — | 501 | 525 | Good | Poor |
| Example 8 | 2,3-dimethyl-2,3-diphenylbutane | 0.5 | Good | — | 501 | 525 | Marginal | Poor |
| Comparative Example 1 | — | — | Good | 0.97 | 501 | 525 | Poor | Poor |

[5] The curable composition according to [1] or [2], wherein $R^1$ and $R^2$ in Formula (1) are identical or different, and each are a group represented by Formula (r-1) or a group represented by Formula (r-5).

[6] The curable composition according to any one of [1] to [5], wherein $D^1$ and $D^2$ in Formula (1) are identical or different, and each are a group selected from groups having structures represented by Formulas (d-1) to (d-4).

[7] The curable composition according to any one of [1] to [6], wherein an $R^1$-$D^1$-moiety and an $R^2$-$D^2$-moiety in Formula (1) are identical or different, and each are a group represented by Formula (rd-1) or (rd-2).

[8] The curable composition according to any one of [1] to [6], wherein the $R^1$-$D^1$-moiety and the $R^2$-$D^2$-moiety in Formula (1) are identical or different, and each are a group represented by Formula (rd-1-1) or (rd-2-1).

[9] The curable composition according to any one of [1] to [8], wherein $Ar^1$ to $Ar^3$ in Formula (I) and Formula (II) are identical or different, and each are an arylene group having from 6 to 14 carbons or a group in which two or more arylene groups having from 6 to 14 carbons are bonded via a single bond, a linear or branched alkylene group having from 1 to 5 carbons, or a group in which one or more hydrogen atoms of a linear or branched alkylene group having from 1 to 5 carbons are substituted by halogen atom(s).

[10] The curable composition according to any one of [1] to [8], wherein $Ar^1$ to $Ar^3$ in Formula (I) and Formula (II) are identical or different, and each are a group represented by Formulas (a-1) to (a-5).

[11] The curable composition according to any one of [1] to [8], wherein $Ar^1$ to $Ar^3$ in Formula (I) and Formula (II) are identical or different, and each are a group represented by Formula (a-1) or a group represented by Formula (a-2).

[12] The curable composition according to any one of [1] to [11], wherein X in Formula (I) represents —CO— or —SO$_2$.

[13] The curable composition according to any one of [1] to [12], wherein L in Formula (1) is a divalent group represented by Formula (L-1).

[14] The curable composition according to any one of [1] to [12], wherein L in Formula (1) is a divalent group represented by Formula (L-1-1) or a divalent group represented by Formula (L-1-2).

[15] The curable composition according to any one of [1] to [14], wherein a structure represented by Formula (I) is a structure derived from benzophenone.

[16] The curable composition according to [15], wherein a proportion of a structural unit derived from benzophenone in a total amount of the compound represented by Formula (1) is 5 wt. % or greater.

[17] The curable composition according to any one of [1] to [16], wherein a structure represented by Formula (II) is a structure derived from at least one compound selected from the group consisting of hydroquinone, resorcinol, 2,6-naphthalenediol, 2,7-naphthalenediol, 4,4'-dihydroxybiphenyl, 4,4'-dihydroxydiphenyl ether, 4,4'-dihydroxybenzophenone, 4,4'-dihydroxydiphenyl sulfide, 4,4'-dihydroxydiphenyl sulfone, and bisphenol A.

[18] The curable composition according to [17], wherein a proportion of a structural unit derived from hydroquinone, resorcinol, 2,6-naphthalenediol, 2,7-naphthalenediol, 4,4'-dihydroxybiphenyl, 4,4'-dihydroxydiphenyl ether, 4,4'-dihydroxybenzophenone, 4,4'-dihydroxydiphenyl sulfide, 4,4'-dihydroxydiphenyl sulfone, and bisphenol A in a total amount of the compound represented by Formula (1) is 5 wt. % or greater.

[19] The curable composition according to any one of [1] to [18], wherein the compound represented by Formula (1) has a number average molecular weight from 1000 to 15000 as determined by GPC measurement calibrated with polystyrene standard.

[20] The curable composition according to any one of [1] to [19], wherein the compound represented by Formula (1) has a glass transition temperature of 280° C. or lower.

[21] The curable composition according to any one of [1] to [20], wherein the compound represented by Formula (1) has an exothermic peak temperature from 170 to 450° C.

[22] A cured product of the curable composition described in any one of [1] to [21].

[23] The cured product according to [22], wherein the cured product has a 5% weight loss temperature ($T_{d5}$) of 300° C. or higher.

[24] A semi-cured product of the curable composition described in any one of [1] to [21].

[25] A structural body including a cured product or a semi-cured product of the curable composition described in any one of [1] to [21].

[26] A laminate including a configuration in which a cured product or semi-cured product of the curable composition described in any one of [1] to [21] and a substrate are laminated.

[27] A method for producing a laminate, including placing the curable composition described in any one of [1] to [21] on a substrate and performing heat treatment to obtain a laminate having a configuration in which a cured product or a semi-cured product of the curable composition and the substrate are laminated.

[28] The method for producing a laminate according to [26] or [27], wherein the method includes applying a molten product of the curable composition on a support made of plastic, solidifying the applied molten product to form a thin film containing the curable compound, peeling the formed thin film from the support, laminating the formed thin film on a substrate, and performing heat treatment.

[29] A composite material including a cured product or a semi-cured product of the curable composition described in any one of [1] to [21] and a fiber.

[30] A method for producing a composite material, including impregnating a fiber with the curable composition described in any one of [1] to [21], curing or semi-curing the impregnated curable compound by performing heat treatment to obtain a composite material including a cured product or a semi-cured product of the curable composition and the fiber.

[31] An adhesive agent containing the curable composition described in any one of [1] to [21].

[32] A method for producing an adhesive agent, including producing an adhesive agent using the curable composition described in any one of [1] to [21].

[33] A paint including the curable composition described in any one of [1] to [21].

[34] A method for producing a paint, including producing a paint using the curable composition described in any one of [1] to [21].

[35] A sealing agent including the curable composition described in any one of [1] to [21].

[36] A method for producing a sealing agent, including producing a sealing agent using the curable composition described in any one of [1] to [21].

INDUSTRIAL APPLICABILITY

The curable composition according to an embodiment of the present disclosure can form a cured product having super heat resistance, flame retardance, and good dielectric properties. Accordingly, the curable composition can be suitably used in an adhesive agent, a sealing agent, a paint, a sizing agent, and the like, which are used for manufacturing electronic information devices, household appliances, automobiles, precision machines, aircraft, devices for aerospace industry, and the like.

The invention claimed is:

1. A curable composition comprising a curable compound represented by Formula (1) and a radical polymerization initiator:

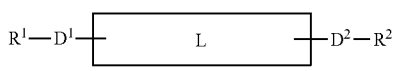
(1)

where $R^1$ and $R^2$ are each, identically or differently, a curable functional group, and $D^1$ and $D^2$ are each, identically or differently, a single bond or a linking group; L is a divalent group having a repeating unit containing a structure represented by Formula (I) and a structure represented by Formula (II):

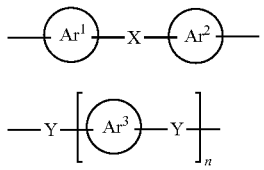

(I)

(II)

where $Ar^1$ to $Ar^3$ are each, identically or differently, an arylene group or a group in which two or more arylene groups are bonded via a single bond or a linking group; X is —CO—, —S—, or —SO$_2$—;
Y is each, identically or differently, —S—, —SO$_2$—, —O—, —CO—, —COO—, or —CONH—; and n is an integer of 0 or greater,
wherein the radical polymerization initiator is a peroxide or a peracid ester,
wherein $D^1$ and $D^2$ in Formula (1) are each, identically or differently, a group selected from groups having structures represented by Formulas (d-1) to (d-4):

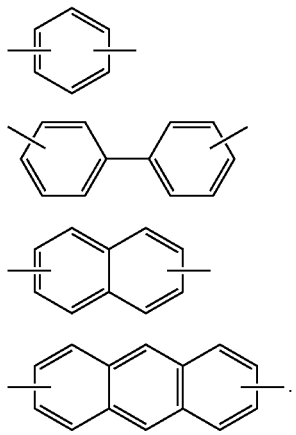

(d-1)

(d-2)

(d-3)

(d-4)

2. The curable composition according to claim 1, wherein $R^1$ and $R^2$ in Formula (1) are each, identically or differently, a curable functional group having a cyclic imide structure.

3. The curable composition according to claim 1, wherein $R^1$ and $R^2$ in Formula (1) are each, identically or differently, a group selected from groups represented by Formulas (r-1) to (r-6):

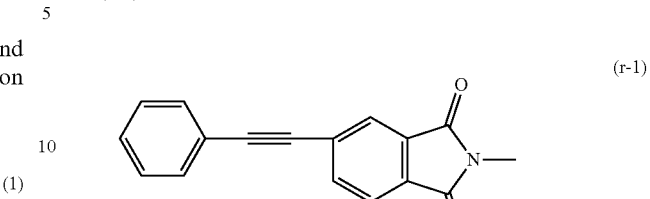
(r-1)

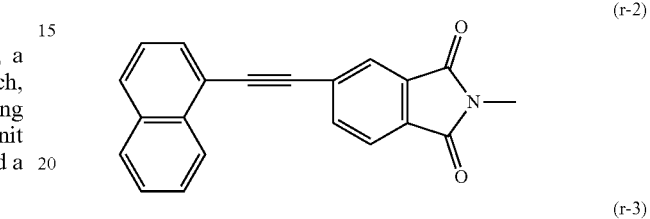
(r-2)

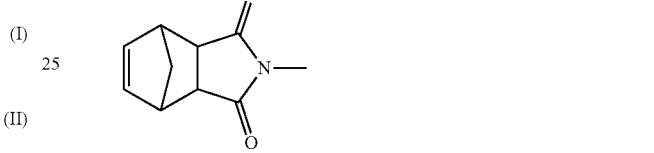
(r-3)

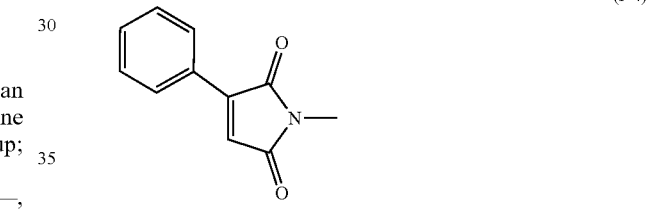
(r-4)

(r-5)

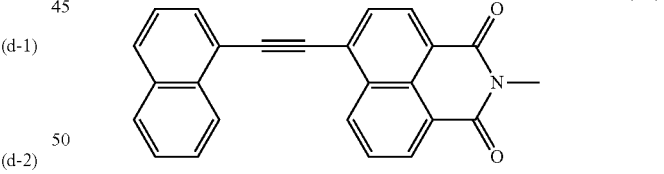
(r-6)

where a bond from a nitrogen atom in each of the formulas bonds to $D^1$ or $D^2$.

4. The curable composition according to claim 1, wherein $Ar^1$ to $Ar^3$ in Formula (I) and Formula (II) are each, identically or differently, an arylene group having from 6 to 14 carbons or a group in which two or more arylene groups having from 6 to 14 carbons are bonded via a single bond, a linear or branched alkylene group having from 1 to 5 carbons, or a group in which one or more hydrogen atoms of a linear or branched alkylene group having from 1 to 5 carbons are substituted by a halogen atom.

5. The curable composition according to claim 1, wherein the structure represented by Formula (I) is a structure derived from benzophenone.

6. The curable composition according to claim 5, wherein a proportion of a structural unit derived from benzophenone in a total amount of the compound represented by Formula (1) is 5 wt. % or greater.

7. The curable composition according to claim 1, wherein the structure represented by Formula (II) is a structure derived from at least one compound selected from the group consisting of hydroquinone, resorcinol, 2,6-naphthalenediol, 2,7-naphthalenediol, 4,4'-dihydroxybiphenyl, 4,4'-dihydroxydiphenyl ether, 4,4'-dihydroxybenzophenone, 4,4'-dihydroxydiphenyl sulfide, 4,4'-dihydroxydiphenyl sulfone, and bisphenol A.

8. The curable composition according to claim 7, wherein a proportion of a structural unit derived from hydroquinone, resorcinol, 2,6-naphthalenediol, 2,7-naphthalenediol, 4,4'-dihydroxybiphenyl, 4,4'-dihydroxydiphenyl ether, 4,4'-dihydroxybenzophenone, 4,4'-dihydroxydiphenyl sulfide, 4,4'-dihydroxydiphenyl sulfone, and bisphenol A in a total amount of the compound represented by Formula (1) is 5 wt. % or greater.

9. A cured product of the curable composition described in claim 1.

10. A semi-cured product of the curable composition described in claim 1.

11. A structural body comprising a cured product or a semi-cured product of the curable composition described in claim 1.

12. A laminate having a configuration in which a cured product or semi-cured product of the curable composition described in claim 1 and a substrate are laminated.

13. A method for producing a laminate, comprising placing the curable composition described in claim 1 on a substrate and performing heat treatment to obtain a laminate having a configuration in which a cured product or semi-cured product of the curable composition and the substrate are laminated.

14. The method for producing a laminate according to claim 13, wherein the method comprises applying a molten product of the curable composition on a support made of plastic, solidifying the applied molten product to form a thin film containing the curable compound, peeling the formed thin film from the support, laminating the formed thin film on a substrate, and performing heat treatment.

15. A composite material comprising a cured product or a semi-cured product of the curable composition described in claim 1 and a fiber.

16. An adhesive agent comprising the curable composition described in claim 1.

17. A paint comprising the curable composition described in claim 1.

18. A sealing agent comprising the curable composition described in claim 1.

* * * * *